(12) United States Patent
Maeda et al.

(10) Patent No.: US 9,380,014 B2
(45) Date of Patent: Jun. 28, 2016

(54) ELECTRONIC CAMERA AND SERVER DEVICE

(71) Applicant: NIKON CORPORATION, Tokyo (JP)

(72) Inventors: Hirotaka Maeda, Tokyo (JP); Mio Nagisa, Tokyo (JP); Motoyuki Kuboi, Yokohama (JP); Gaku Ito, Yokohama (JP); Takeshi Shinohara, Chofu (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/325,974

(22) Filed: Jul. 8, 2014

(65) Prior Publication Data

US 2014/0325004 A1  Oct. 30, 2014

Related U.S. Application Data

(62) Division of application No. 12/310,241, filed as application No. PCT/JP2007/066311 on Aug. 22, 2007, now abandoned.

(30) Foreign Application Priority Data

Aug. 23, 2006 (JP) ................. 2006-227088
Aug. 23, 2006 (JP) ................. 2006-227089
Aug. 23, 2006 (JP) ................. 2006-227190
Aug. 23, 2006 (JP) ................. 2006-227191

(51) Int. Cl.
*H04L 12/58* (2006.01)
*H04N 1/00* (2006.01)
(Continued)

(52) U.S. Cl.
CPC .............. *H04L 51/24* (2013.01); *H04N 1/0097* (2013.01); *H04N 1/00204* (2013.01);
(Continued)

(58) Field of Classification Search
CPC .......... H04N 1/00204; H04N 1/00212; H04N 1/00222; H04N 1/00233; H04N 1/00244; H04N 1/00925; H04N 5/23206
See application file for complete search history.

(56) References Cited

U.S. PATENT DOCUMENTS 6,035,323 A  3/2000 Narayen et al.
6,101,526 A  8/2000 Mochizuki
(Continued)

FOREIGN PATENT DOCUMENTS

JP  A-07-175620  7/1995
JP  A-2001-175904  6/2001
(Continued)

OTHER PUBLICATIONS

Feb. 26, 2013 Japanese Office Action issued in Application No. 2011-028513 (w/ English Translation).
(Continued)

*Primary Examiner* — Daniel M Pasiewicz
(74) *Attorney, Agent, or Firm* — Oliff PLC

(57) ABSTRACT

A server device that includes a receiving unit, a browse page creation unit, a mail creation unit, and a mail transmission unit. The receiving unit receives an image transmitted from an electronic camera via a wireless network. The browse page creation unit creates a browse page for browsing the transmitted image from the electronic camera, the image having been received by the receiving unit. The mail creation unit creates a notification mail for introducing the browse page that has been created by the browse page creation unit to a person other than a user of the electronic camera. Furthermore, the mail transmission unit transmits the notification mail that has been created by the mail creation unit to a specified mail address.

7 Claims, 22 Drawing Sheets

(51) Int. Cl.
*H04N 21/81* (2011.01)
*H04N 5/232* (2006.01)
*H04N 21/2747* (2011.01)
*H04N 7/173* (2011.01)
*H04N 21/61* (2011.01)
*H04N 21/4223* (2011.01)
*H04N 21/222* (2011.01)
*H04N 21/6334* (2011.01)
*H04N 21/258* (2011.01)
*H04N 101/00* (2006.01)

(52) U.S. Cl.
CPC ...... *H04N 1/00212* (2013.01); *H04N 1/00222* (2013.01); *H04N 1/00233* (2013.01); *H04N 1/00244* (2013.01); *H04N 1/00925* (2013.01); *H04N 5/23206* (2013.01); *H04N 7/173* (2013.01); *H04N 21/2223* (2013.01); *H04N 21/25875* (2013.01); *H04N 21/2747* (2013.01); *H04N 21/4223* (2013.01); *H04N 21/6162* (2013.01); *H04N 21/6334* (2013.01); *H04N 21/8153* (2013.01); *H04N 2101/00* (2013.01); *H04N 2201/0084* (2013.01)

(56) References Cited

U.S. PATENT DOCUMENTS

| | | | |
|---|---|---|---|
| 2003/0071900 | A1 | 4/2003 | Aoyagi |
| 2003/0167264 | A1 | 9/2003 | Ogura et al. |
| 2003/0220995 | A1 | 11/2003 | Hitaka et al. |
| 2004/0064834 | A1 | 4/2004 | Kuwata et al. |
| 2004/0143746 | A1* | 7/2004 | Ligeti et al. ............... 713/185 |
| 2004/0163123 | A1* | 8/2004 | Okada et al. ............... 725/116 |
| 2004/0215696 | A1 | 10/2004 | Fisher et al. |
| 2004/0224665 | A1* | 11/2004 | Kokubo ..................... 455/411 |
| 2004/0230663 | A1* | 11/2004 | Ackerman .................. 709/207 |
| 2005/0021985 | A1 | 1/2005 | Ono et al. |
| 2005/0075895 | A1* | 4/2005 | Mohsenin et al. ................. 705/1 |
| 2005/0097173 | A1* | 5/2005 | Johns et al. ................ 709/206 |
| 2005/0226413 | A1 | 10/2005 | Wada |
| 2006/0085847 | A1 | 4/2006 | Ikeuchi et al. |
| 2006/0265458 | A1* | 11/2006 | Aldrich et al. ............... 709/206 |
| 2007/0165580 | A1 | 7/2007 | Ebata |
| 2008/0065737 | A1* | 3/2008 | Burke et al. ................ 709/217 |
| 2010/0085443 | A1 | 4/2010 | Maeda et al. |

FOREIGN PATENT DOCUMENTS

| | | |
|---|---|---|
| JP | A-2002-123637 | 4/2002 |
| JP | A-2002-215644 | 8/2002 |
| JP | A-2002-236642 | 8/2002 |
| JP | A-2003-116089 | 4/2003 |
| JP | A-2003-256281 | 9/2003 |
| JP | A-2003-256461 | 9/2003 |
| JP | A-2003-273800 | 9/2003 |
| JP | A-2004-139161 | 5/2004 |
| JP | A-2004-159258 | 6/2004 |
| JP | A-2004-228793 | 8/2004 |
| JP | A-2004-229177 | 8/2004 |
| JP | A-2004-248232 | 9/2004 |
| JP | A-2004-326340 | 11/2004 |
| JP | A-2005-11157 | 1/2005 |
| JP | A-2005-513877 | 5/2005 |
| JP | A-2006-020298 | 1/2006 |
| JP | A-2006-50587 | 2/2006 |
| JP | A-2006-115024 | 4/2006 |
| JP | A-2006-139757 | 6/2006 |
| JP | A-2006-173914 | 6/2006 |
| JP | A-2006-174060 | 6/2006 |
| JP | A-2006-197214 | 7/2006 |
| JP | A-2007-110275 | 4/2007 |
| WO | WO 03/053042 A2 | 6/2003 |
| WO | WO 2005/079008 A1 | 8/2005 |
| WO | WO 2005/119438 A1 | 12/2005 |

OTHER PUBLICATIONS

Oct. 2, 2012 Japanese Office Action issued in Japanese Patent Application No. 2011-028513 (with translation).

May 22, 2012 Notification of Reasons for Refusal issued in Japanese Patent Application No. 2011-018513 w/translation.

Feb. 21, 2012 Office Action issued in Japanese Patent Application No. 2006-227190 w/translation.

Jun. 21, 2011 Office Action issued in Japanese Patent Application No. 2006-227088 (with translation).

Notification of Reasons for Refusal for corresponding Japanese Patent Application No. 2006227191, mailed on Dec. 14, 2010 (w/ English translation).

May 18, 2010 Japanese Office Action issued in Japanese Patent Application No. 2006-227089 (with English translation).

* cited by examiner

FIG.9
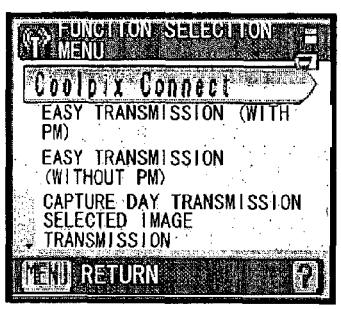
(a) MENU SCREEN
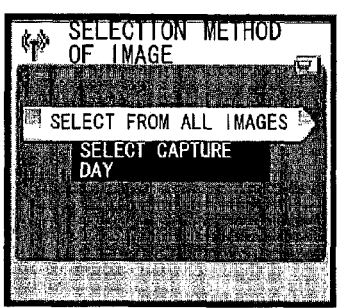
(b) IMAGE SELECTION
METHOD DECISION SCREEN
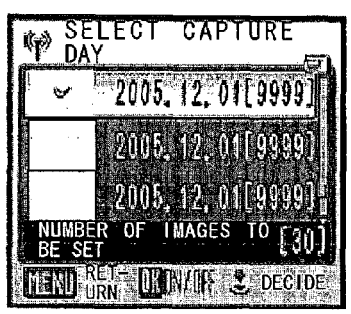
(c) CAPTURE DAY
SELECTION SCREEN
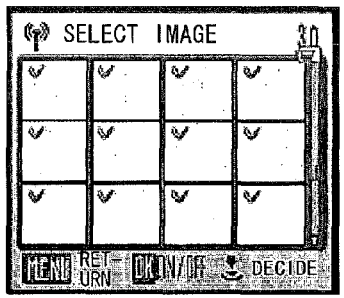
(d) IMAGE SELECTION
SCREEN
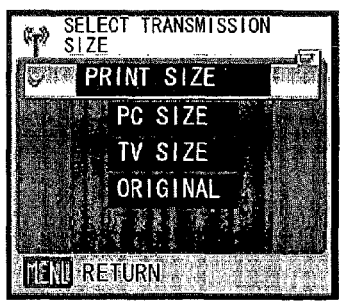
(e) TRANSMISSION SIZE
SELECTION SCREEN
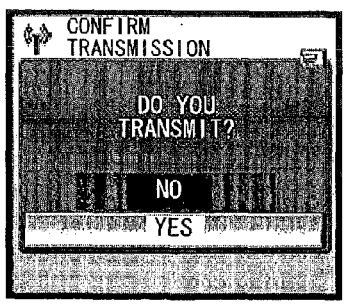
(f) TRANSMISSION
CONFIRMATION SCREEN (a) ADDRESSEE MAIL ADDRESS ENTRY SCREEN
(b) ADDRESSEE MAIL ADDRESS CONFIRMATION SCREEN
(c) ADDRESSEE ERASURE SCREEN
(d) TRANSMISSION CONFIRMATION SCREEN (a) TRANSMISSION RESUMPTION CONFIRMATION SCREEN
(b) SSID SEARCH SCREEN
(c) DESTINATION SELECTION SCREEN (a) MENU SCREEN
(b) DESTINATION SELECTION SCREEN
(c) CONNECTION SCREEN
(d) TRANSMISSION SCREEN
(e) TRANSMISSION COMPLETION SCREEN (a) MENU SCREEN
(b) DESTINATION SELECTION SCREEN
(c) CAPTURE DAY SELECTION SCREEN
(d) CONNECTION SCREEN
(e) TRANSMISSION SCREEN
(f) TRANSMISSION COMPLETION SCREEN

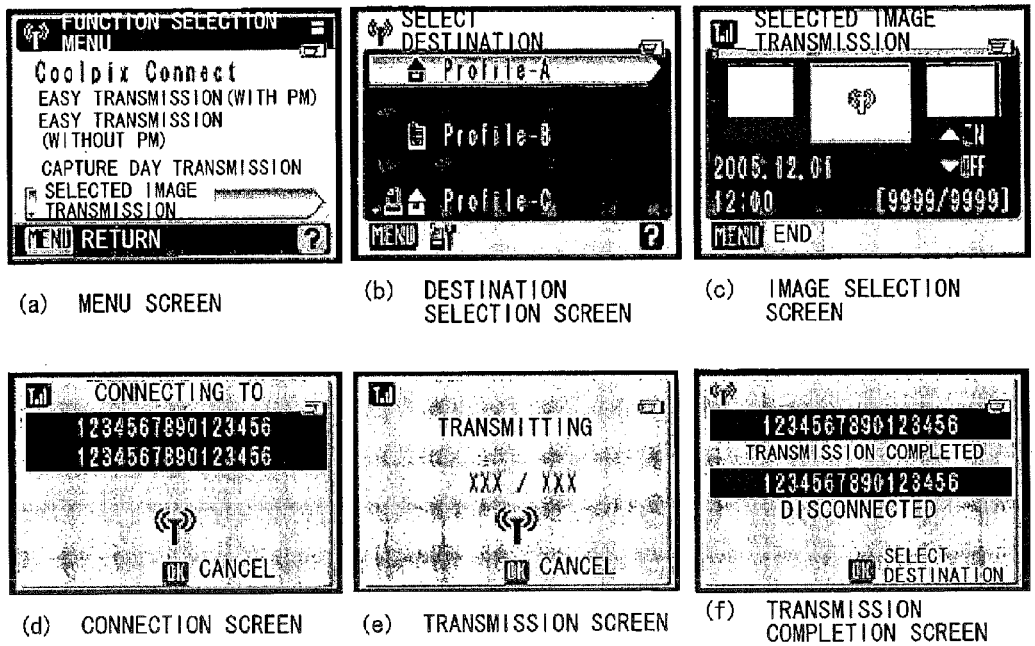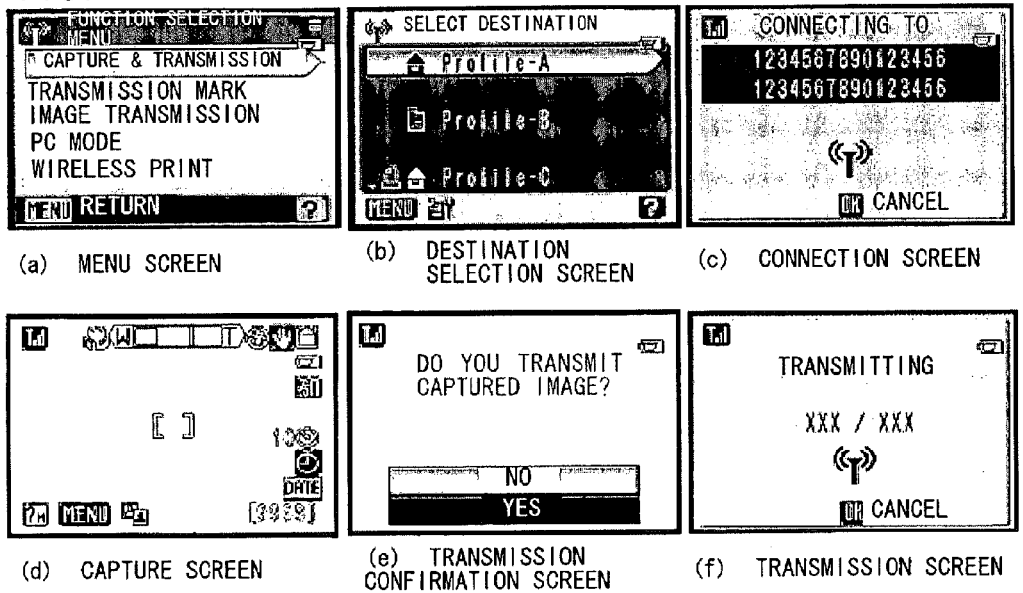

(a) MENU SCREEN
(b) DESTINATION SELECTION SCREEN
(c) CONNECTION SCREEN
(d) TRANSMISSION SCREEN
(e) TRANSMISSION COMPLETION SCREEN (a) MENU SCREEN
(b) DESTINATION SELECTION SCREEN
(c) RESPONSE WAIT SCREEN
(d) CONNECTION COMPLETION SCREEN (a) PRINTER SETTING ERROR SCREEN  (b) PRINTER CONNECTION ERROR SCREEN  (c) PRINTER ERROR SCREEN

ELECTRONIC CAMERA AND SERVER DEVICE

This is a Divisional of application Ser. No. 12/310,241 filed Aug. 21, 2009, which is a National Stage of Application No. PCT/JP2007/066311 filed Aug. 22, 2007. The prior applications, including the specifications, drawings and abstracts are incorporated herein by reference in their entirety.

TECHNICAL FIELD

The present invention relates to an electronic camera that captures an image and transmits the image via wireless network to a server, a personal computer, or a printer, and relates to a server device that receives an image that is transmitted thereto from an electronic camera via wireless network.

BACKGROUND ART

There is a digital camera known in the related art, which detects an access point to connect to wireless LAN and connects to the detected access point so as to transmit image data not yet transmitted to a user terminal to which its address has already been set (see patent reference literature 1).
Patent reference literature 1: Japanese Laid Open Patent Publication No. 2006-115024.

DISCLOSURE OF THE INVENTION

Problems to be Solved by the Invention

The digital camera disclosed in patent reference literature 1 simply transmits an image to a user terminal in which a transmitted image is stored. Therefore, it is not suitable for transmitting an image to a server that uses a transmitted image so as to provide a variety of services.

The user terminal to which an image is transmitted from the digital camera disclosed in patent reference literature 1 simply stores the transmitted image. Therefore it can not provide a valuable service that uses the transmitted image.

The digital camera disclosed in patent reference literature 1 transmits an image to the user terminal that has already been set as a forwarding destination. Therefore, it is not suitable for transmitting an image to one of a server, a personal computer, and a printer, selectively.

Means for Solving the Problems

An electronic camera according to a 1st aspect of the present invention, which captures an image and transmits the image via wireless network to a server, comprises: a transmitting person information registration means that registers transmitting person information entered by a user; and a transmission inhibit means that inhibits image transmission to the server if transmitting person information is not registered by the transmitting person information registration means.

According to a 2nd aspect of the present invention, in the electronic camera according to the 1st aspect, it is preferable that the transmitting person information is a nickname and a mail address of a user.

According to a 3rd aspect of the present invention, the electronic camera according to the 1st or 2nd aspect may further comprise a transmitting person information transmission means that transmits to the server transmitting person information registered by the transmitting person information registration means at a time of image transmission to the server.

According to a 4th aspect of the present invention, the electronic camera according to any one of the 1st through 3rd aspects may further comprise a registration request means that requests a user to register transmitting person information if the user instructs image transmission to the server in a state in which the transmitting person information has not been registered.

A server device according to a 5th aspect of the present invention comprises: a receiving means that receives an image transmitted from an electronic camera via wireless network; a browse page creation means that creates a browse page for browsing the transmitted image from the electronic camera that has been received by the receiving means; a mail creation means that creates a notification mail for introducing the browse page that has been created by the browse page creation means to a person other than a user of the electronic camera; and a mail transmission means that transmits the notification mail that has been created by the mail creation means to a specified mail address.

According to a 6th aspect of the present invention, in the server device according to the 5th aspect, it is preferable that the mail creation means creates a notification mail that includes link information for connecting to the browse page.

According to a 7th aspect of the present invention, in the server device according to the 5th or 6th aspect, it is possible that the mail creation means creates a notification mail having attached thereto a thumbnail image that is a shrunk image of the transmitted image from the electronic camera.

According to an 8th aspect of the present invention, in the server device according to the 7th aspect, it is desirable that, if there are more than a predetermined number of images transmitted from the electronic camera, the mail creation means selects some of the transmitted images and creates a notification mail having attached thereto thumbnail images of selected transmitted images.

According to a 9th aspect of the present invention, in the server device according to the 8th aspect, the mail creation means can make a decision as to which transmitted image to select based upon an order in which each of images transmitted from the electronic camera was captured.

According to a 10th aspect of the present invention, in the server device according to any one of the 5th through 9th aspects, it is preferable that the browse page created by the browse page creation means is erased after a predetermined period of time.

According to an 11th aspect of the present invention, the server device according to any one of the 5th through 10th aspects may further comprise an interruption detection means that detects interruption of image transmission from the electronic camera, and, if interruption of image transmission is detected by the interruption detection means, the mail creation means may suspend creation of the notification mail.

According to a 12th aspect of the present invention, in the server device according to the 11th aspect, it is preferable that, if interruption of image transmission is detected by the interruption detection means, the mail creation means releases suspension of creation of the notification mail when an untransmitted image is retransmitted from the electronic camera.

According to a 13th aspect of the present invention, in the server device according to any one of the 5th through 12th aspects, the browse page creation means may create a browse page that includes a mail address of a user of the electronic camera.

According to a 14th aspect of the present invention, in the server device according to the 13th aspect, it is preferable that the mail address of the user has been registered in advance in the electronic camera, and that the mail address of the user is transmitted when an image is transmitted from the electronic camera.

A server device according to a 15th aspect of the present invention comprises: an album registration means that registers an online album for each user of an electronic camera; a folder setting means that sets a plurality of folders in each online album registered by the album registration means; a receiving means that receives an image transmitted from the electronic camera via wireless network; and an image storage means that stores the transmitted image from the electronic camera that is received by the receiving means in one of the plurality of folders that have been set in an online album of a user of the electronic camera by the folder setting means.

According to a 16th aspect of the present invention, in the server device according to the 15 aspect, it is preferable that the image storage means stores the transmitted image from the electronic camera in an initial folder that has been set in advance from among the plurality of folders.

According to a 17th aspect of the present invention, in the server device according to the 16th aspect, it is desirable that an image stored in the initial folder is not published to anyone but the user.

An electronic camera according to an 18th aspect of the present invention, which captures an image and transmits the image via wireless network to a server, a personal computer, or a printer, comprises: a wireless communication means for performing a wireless communication with an access point that is located in the wireless network; a mode switch means that switches in response to operation input of a user between a variety of operation modes including at least a capture mode for capturing an image and a wireless LAN mode for performing a wireless communication with the access point by the wireless communication means so as to transmit an image to the server, the personal computer, or the printer; and a search means that searches an access point that can communicate wirelessly with the wireless communication means when an operation mode is switched to the wireless LAN mode by the mode switch means.

According to a 19th aspect of the present invention, it is preferable that the electronic camera according to the 18th aspect further comprises: an access point selection means that selects in response to operation input of the user one of access points that have been found by the search means; and a menu display control means that displays on a display device a menu screen on which a list of a variety of menu items is displayed in accordance with a selection result of access point by the access point selection means, and that the menu display control means varies a display configuration of the menu screen depending upon a network connection configuration of an access point that has been selected by the access point selection means.

According to a 20th aspect of the present invention, in the electronic camera according to the 19th aspect, it is desirable that the menu display control means displays menu items in a list on the menu screen that vary depending on whether or not the selected access point is connected to a server.

According to a 21st aspect of the present invention, in the electronic camera according to the 19th or 20th aspect, the menu display control means may display menu items in a list on the menu screen that vary depending on whether or not the selected access point is connected to a personal computer.

According to a 22nd aspect of the present invention, in the electronic camera according to any one of the 19th through 21st aspects, the menu display control means may also display menu items in a list on the menu screen that vary depending on whether or not the selected access point is connected to a printer.

According to a 23rd aspect of the present invention, in the electronic camera according to any one of the 19th through 22nd aspects, it is possible that the menu display control means does not display the menu screen if the selected access point is connected only to either a server or a printer.

According to a 24th aspect of the present invention, in the electronic camera according to any one of the 19th through 23rd aspects, the menu display control means can make a decision as to a network connection configuration of the selected access point based upon profile information of each device that has been registered in advance.

An electronic camera according to a 25th aspect of the present invention, which captures an image and transmits the image via wireless network to a server, a personal computer, or a printer, comprises: a wireless communication means for performing a wireless communication with an access point that is located in the wireless network; and an image selection means that selects an image to be transmitted to the server, the personal computer, or the printer, in response to operation input of a user. The wireless communication means starts the wireless communication with the access point after an image is selected by the image selection means.

According to a 26th aspect of the present invention, in the electronic camera according to the 25th aspect, it is preferable that the wireless communication means terminates the wireless communication with the access point after the selected image is transmitted.

According to a 27th aspect of the present invention, it is desirable that the electronic camera according to the 26th aspect further comprises a power supply stop means that stops power supply to the wireless communication means after the wireless communication with the access point is terminated by the wireless communication means.

Advantageous Effect of the Invention

According to the present invention, an electronic camera can be provided, which is suitable for transmitting an image to a server that uses a transmitted image so as to provide a variety of services.

In addition, according to the present invention, a valuable service can be provided using the image transmitted from the electronic camera to the server device.

Furthermore, according to the present invention, an electronic camera can be provided, which is suitable for transmitting an image to one of a server, a personal computer, and a printer, selectively.

BRIEF DESCRIPTION OF THE DRAWINGS

FIG. 9 is an illustration showing examples of a screen displayed on the electronic camera when the online album server transmission processing is executed.

FIG. 16 is an illustration showing examples of a screen displayed on the electronic camera when an image transmission to a PC is performed in Selected Image Transmission.

FIG. 17 is an illustration showing examples of a screen displayed on the electronic camera when an image transmission to a PC is performed in Capture & Transmission.

BEST MODE FOR CARRYING OUT THE INVENTION

1. Configuration

Figure 1:
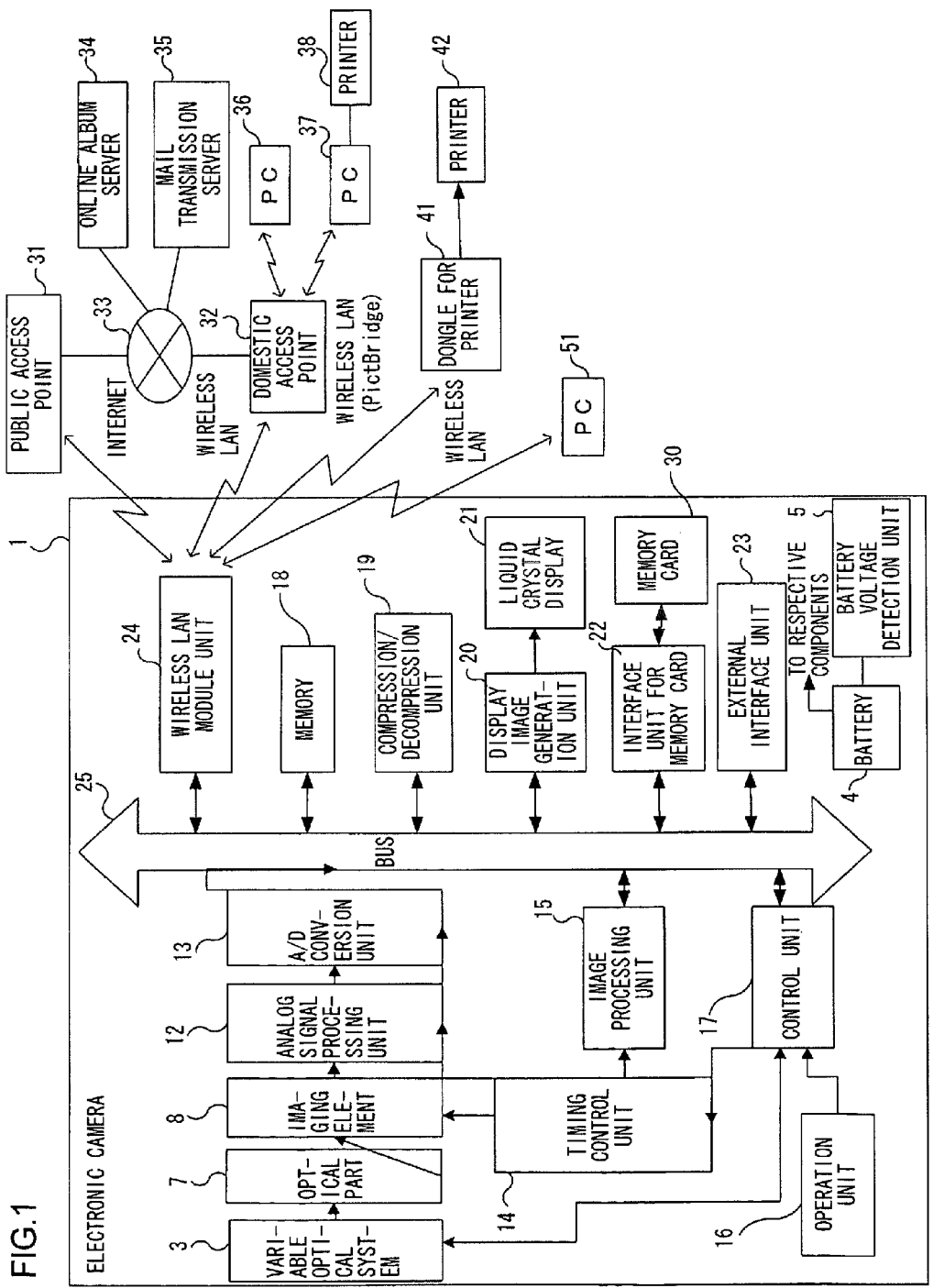
FIG. 1 is a schematic diagram of an image transmission system according to an embodiment of the present invention.

A configuration of an image transmission system according to an embodiment of the present invention is shown in FIG. 1. An electronic still camera with a wireless LAN connection function (hereinafter called an electronic camera) 1 is connected via a wireless LAN to an public access point 31, a domestic access point 32, a dongle for printer 41, or a PC (personal computer) 51. Wireless LAN connection mode for the public access point 31 and the domestic access point 32 is infrastructure mode, while that for the dongle for printer 41 and the PC 51 is ad hoc mode. The public access point 31 and the domestic access point 32 are connected to an Internet 33. The Internet 33 is connected with an online album server 34 and a mail transmission server 35.

The public access point 31 is located in a public place such as an airport, a railway station, a hotel, or a restaurant. A user of the electronic camera 1 applies for the use of the service with a service provider in advance by paying a predetermined fee so as to obtain usage information for using the public access point 31. The usage information includes a user name and a password that are used for user authentication when the user connects to the public access point 31. The usage information for a limited time may be provided to a user for free at the time of the sale of the electronic camera 1. Alternatively, the public access point 31 may be available to anyone for free without performing a user authentication. On the other hand, the domestic access point 32 is located in the user's home or office, such that only the user and relevant persons can use the same.

The online album server 34 provides the user of the electronic camera 1 with an online album service. The online album service is a service that allows an image which has been transmitted from the electronic camera 1 to be stored with respect to each user, and, as necessary, allows the image to be published on the Internet. The online album server 34 includes separate online albums registered therein in advance for each user who owns the electronic camera 1. The online album includes a plurality of folders individually set therein. When a captured image is transmitted from the electronic camera 1 of the user to the online album server 34 via wireless LAN and the Internet 33, the transmitted image is stored in one of the plurality of folders provided in the online album of the user.

The mail transmission server 35 provides the user of the electronic camera 1 with a mail transmission service. The mail transmission service is a service that upon receiving an image transmitted from the electronic camera 1 creates a notification mail with a thumbnail image of the transmitted image attached thereto and transmits the same to a specified mail address. The user uses the mail transmission service so as to transmit a notification mail to another person to whom the user introduces the image transmitted from the electronic camera 1. Furthermore, the mail transmission server 35 creates a browse page so that the recipient of the notification mail can browse the image thereon and publishes the same on the Internet. For this reason, the notification mail therein contains link information to the browse page.

The user can use either the online album service provided by the online album server 34 or the mail transmission service provided by the mail transmission server 35. The selection of which service to use may be arranged to be made by the user in each time of the use or in advance, or otherwise by the manufacturer of the electronic camera 1 in advance. More specifically, in the case where the electronic cameras 1 are shipped to a variety of shipment destinations (shipment target areas), the manufacturer often performs the setting of destinations of the electronic cameras 1 in advance so as to adjust specifications of each of the electronic cameras 1 to its destination. In this case, a decision can be made as to which one of the services to use depending on the destination. After the service to be used is thus determined in the electronic camera 1 by the user's selection or the settings of the destination, depending on the selection result or the destination, either the online album server 34 or the mail transmission server 35 is selected as a forwarding destination of the image.

The domestic access point 32 is connected with PCs (personal computers) 36 and 37 via wireless LAN as well as with the electronic camera 1. When an image is captured with the electronic camera 1 and transmitted therefrom, the PCs 36 and 37 obtains the image so as to record and save it or performs a variety of image processing upon the same. The PC 37 is connected with a printer 38, which prints out the image obtained by the PC 37.

The dongle for printer 41 is a print server for wireless LAN which is attached to a USB (Universal Serial Bus) port of a printer 42 or the like. An image that is received from the electronic camera 1 is output to the printer 42 via the dongle for printer 41. This makes it possible for the printer 42 to perform the print of the image without using any PC. Similarly to the PC 36 and 37 which are connected to the domestic access point 32, the PC 51 has a wireless LAN communication function, which obtains an image transmitted from the electronic camera 1 so as to record and save it or executes a variety of image processing upon the same.

The electronic camera 1 includes a battery 4, a battery voltage detection unit 5, a variable optical system 3, an optical part 7, an imaging element 8, an analog signal processing unit 12, an A/D conversion unit 13, a timing control unit 14, an image processing unit 15, an operation unit 16, a control unit 17, a memory 18, a compression/decompression unit 19, a display image generation unit 20, a liquid crystal display 21, an interface unit 22 for memory card, an external interface unit 23, and a wireless LAN module unit 24.

The battery 4 supplies each of the units of the electronic camera 1 with electric power necessary for operation thereof. The electric power supply from the battery 4 to each of the units is enabled or disabled depending on operating state of the electronic camera 1. The electric power supply state control is performed by the control unit 17. Output voltage (battery voltage) from the battery 4 is detected by the battery voltage detection unit 5. The detection result of the battery voltage is sent from the battery voltage detection unit 5 to the control unit 17.

The variable optical system 3 is constituted by a capturing lens including a plurality of optical lens groups, an aperture, a shutter, and the like. The optical part 7 is constituted by an optical filter, a cover glass, and the like. When a light flux from a subject passes through the variable optical system 3 and the optical part 7, an image of the subject is formed on the imaging element 8.

The imaging element 8 captures the image of the subject formed by the variable optical system 3 and outputs an image signal (capture signal) corresponding to the captured image of the subject. The imaging element 8 includes a rectangular-shaped imaging area constituted by a plurality of pixels and sequentially outputs the image signal, which is an analog signal corresponding to electric charge stored in each of the pixels, to the analog signal processing unit 12 on a pixel-by-pixel basis. The imaging element 8 is constituted by, for example, a single-chip color CCD or the like. The analog signal processing unit 12 includes therein a CDS (correlated double sampling) circuit, an AGC (auto gain control) circuit, and the like so as to perform a predetermined analog processing on the input image signal. The A/D conversion unit 13 converts the analog signal processed by the analog signal processing unit 12 into a digital signal. The timing control unit 14 is controlled by the control unit 17 and controls timing of each operation of the imaging element 8, the analog signal processing unit 12, the A/D conversion unit 13, and the image processing unit 15.

The interface unit 22 for memory card interfaces with a memory card (card-shaped removable memory) 30 provided in the electronic camera 1. The external interface unit 23 interfaces with an external device via a predetermined cable in accordance with a signal standard such as USB. The wireless LAN module unit 24 performs processing on data such as format conversion, encryption, modulation and demodulation, or frequency conversion, and transmits and receives radio waves for wireless LAN with the public access point 31, the domestic access point 32, the dongle for printer 41, or the PC 51.

The operation unit 16 includes a variety of operation buttons and switches such as a release button, a mode dial, a play button, a direction button, a menu button, an enter button, a delete button, a help button, and the like. The mode dial is a selection dial for switching operation mode of the camera. The operation mode that is switched by the mode dial includes at least a capture mode for capturing an image and a wireless LAN mode for performing wireless communication with the public access point 31, the domestic access point 32, the dongle for printer 41, or the PC 51 so as to transmit an image to the online server 34, the mail transmission server 35, the PC 36, the PC 37, the printer 38, the printer 42, or the PC 51.

The play button is a button for displaying the replay image on the liquid crystal display 21. The direction button is a button for moving a selected position on an operation screen displayed on the liquid crystal display 21. The menu button is a button for displaying a menu screen on the liquid crystal display 21. The enter button is a button for determining an operation. The delete button is a button for deleting an unnecessary image or the like. The help button is a button for displaying more detailed information or the like. It should be noted that a plurality of functions may be assigned to one button and used selectively depending on the operating state.

The liquid crystal display 21 is a display device that displays a variety of operation screens, an image of the subject captured by the imaging element 8 or the replay image based on image data stored in the memory card, depending on operation state of the electronic camera 1. Output of the operation unit 16 is input to the control unit 17, output of the display image generation unit 20 is input to the liquid crystal display 21. The image processing unit 15 is constituted by, for instance, a single-chip microprocessor which is dedicated to image processing. A flash memory is used as the memory 18, which stores a control software for the electronic camera 1 or data such as access point information, profile information, or the like, as described below.

The A/D conversion unit 13, the image processing unit 15, the control unit 17, the memory 18, the compression/decompression unit 19, the display image generation unit 20, the interface unit 22 for memory card, the external interface unit 23, and the wireless LAN module unit 24 are interconnected via a bus 25.

In the electronic camera 1, which has the configuration as shown in FIG. 1, when a user operates the operation unit 16 so as to select the capture mode and presses the release button, the control unit 17 controls the variable optical system 3 so as to perform the focus adjustment as well as performs via the timing control unit 14 timing control of the imaging element 8, the analog signal processing unit 12, and the A/D conversion unit 13, and performs the capture of an image of the subject. It should be noted that a plurality of capture modes may be made selectable depending on the type of subject or the like and timing control may be varied depending on the capture mode.

The imaging element 8 generates an image signal that corresponds to the image of the subject which has been formed in the imaging area by the variable optical system 3. The image signal is subjected to a predetermined analog signal processing by the analog signal processing unit 12 and is output to the A/D conversion unit 13 as an analog-processed image signal. The A/D conversion unit 13 digitizes the analog-processed image signal and provides the same to the image processing unit 15 as image data.

The electronic camera 1 according to the present embodiment includes the imaging element 8, for example, with color filters of R (red), G (green), and B (blue), which are the most representative of single-chip color imaging elements, in the Bayer array, and the image data provided to the image processing unit 15 are therefore represented in the RGB color system. Each pixel that constitutes the image data contains color information of a color component of one of R, G, and B. Here, while a photoelectric conversion element that constitutes the imaging element 8 is referred to as a pixel, a unit of the image data corresponding to the pixel is also referred to as a pixel. An image is also constituted by a plurality of pixels.

The image processing unit 15 performs image processing on this type of image data, including interpolation, gradation conversion, edge enhancement, and the like. The image data on which this type of image processing has been completed is subjected to a predetermined compression processing by the compression/decompression unit 19 as necessary and is stored in the memory card 30 through the interface unit 22 for memory card. It should be noted that image-processed image data means interpolation-processed image data that contains color information of all the color components of R, G, and B in each of the pixels.

In response to the operation of the user, the image data stored in the memory card 30 are wirelessly transmitted from the wireless LAN module unit 24 to the public access point 31, the domestic access point 32, the dongle for printer 41, or the PC 51. The wireless transmission is performed based on a general wireless LAN signal standard, such as IEEE 802.11b or IEEE 802.11g. Furthermore, the wireless transmission may correspond to WiFi (Wireless Fidelity) certification, an international standard which ensures compatibility between a variety of wireless LAN devices.

The public access point 31 and the domestic access point 32 relay the image data transmitted from the wireless LAN module unit 24 of the electronic camera 1 to the online album server 34 or the mail transmission server 35 via the Internet 33. The domestic access point 32 transmits the image data transmitted from the wireless LAN module unit 24 to the PC 36 and the PC 37. The image data transmitted from the wireless LAN module unit 24 is output to the printer 42 via the dongle for printer 41.

As explained above, the electronic camera 1 is connected with the online album server 34, the mail transmission server 35, the PC 36, the PC 37, the printer 42, or the PC 51 via wireless LAN. This allows an image captured with the electronic camera 1 to be transmitted from the electronic camera 1 to those servers and those devices. It should be noted that the transmission of the image from the electronic camera 1 is performed based on a known protocol referred to as PTPIP (Picture Transfer Protocol over Internet Protocol). The printer 42 corresponds to PictBridge standard.

2. Wireless LAN Setting

Wireless LAN setting will now be explained. As explained above, the electronic camera 1 and the public access point 31 or the domestic access point 32 are connected to each other via wireless LAN, such that the image captured with the electronic camera 1 is transmitted to the online album server 34 or the mail transmission server 35. Moreover, the electronic camera 1 and the domestic access point 32 are connected to each other via wireless LAN, such that the image is transmitted to the PC 36 or the PC 37. The electronic camera 1 and the dongle for printer 41 are connected to each other via wireless LAN, such that the image is transmitted to the printer 42. The electronic camera 1 and the PC 51 are connected to each other via wireless LAN, such that the image is transmitted to the PC 51. To perform this type of wireless LAN connection, it is required in advance to register information necessary for wireless LAN connection in the electronic camera 1.

The wireless LAN connection information registered with the electronic camera 1 includes access point information that is used when connecting to the public access point 31 and profile information that is used when connecting to the domestic access point 32, the dongle for printer 41, or the PC 51. The access point information and the profile information are stored and saved in the memory 18 so as to prevent from being erased even when the electronic camera 1 is powered off.

The access point information includes information stored therein such as the name of the public access point 31, the SSID (Service Set Identifier) of wireless LAN, a method to obtain an IP address, an authentication method, the type of cipher mode and the content of the cipher key used upon the identification, a user name, a password, and the like. It should be noted that if the electronic camera 1 can connect to a plurality of public access points with different SSIDs, the access point information is registered for each of the available public access points.

The profile information includes information stored therein such as the name of the profile, the SSID of wireless LAN, a method to obtain an IP address, an authentication method, the type of cipher mode and the content of the cipher key that are used upon the authentication, the type of connection device, date and time of profile creation, date and time of the last access, and the like. It should be noted that if the electronic camera 1 can connect to a plurality of devices via the same access point, the profile information is registered for each of the devices. More specifically, in FIG. 1, the profile information is registered for each of the devices that is connected to the electronic camera 1 via the domestic access point 32, i.e., the online album server 34, the mail transmission server 35, the PC 36, the PC 37, and the printer 38. Furthermore, the profile information is registered also for each of the printer 42 and the PC 51, which are connected to the electronic camera 1 without passing through the domestic access point 32.

The registration of the access point information and that of the profile information other than for the printer 42 are performed by the electronic camera 1 connected to the PC 36, 37, or 51 via wireline connection using a cable. It should be noted that when the profile information is registered, the corresponding PC is required to be connected to the electronic camera 1. More specifically, when the profile information of the PC 36 is registered, the electronic camera 1 and the PC 36 are connected to each other. When the profile information of the PC 37 or the printer 38 is registered, the electronic camera 1 and the PC 37 are connected to each other. When the profile information of the PC 51 is registered, the electronic camera 1 and the PC 51 are connected to each other. At this time, the electronic camera 1 is connected to the cable via the external interface 23.

Suppose that the user operates the mode dial of the electronic camera 1 which is connected to the PC 36, 37, or 51 via the cable as described above and moves the mode dial to "SETUP" position. At this time, the PC 36, 37, or 51 executes a pre-installed software program for wireless LAN setup, enabling a variety of information such as network information related to wireless LAN setup to be transmitted from the PC 36, 37, or 51 to the electronic camera 1.

The control unit 17 performs processing so that the electronic camera 1 receives and obtains the information transmitted thereto from the PC 36, 37, or 51 via the cable in the above described manner, creating access information or the profile information based on the content thereof. The access information or the profile information is written in the memory 18 and stored and saved therein so as to be registered in the electronic camera 1. Based on the content of the access information or the profile information, the wireless LAN module unit 24 performs connection processing for the wireless LAN connection of the electronic camera 1.

On the other hand, the registration of the profile information of the printer 42 is performed not by a cable connection but by a wireless connection between the electronic camera 1 and the dongle for printer 41. This wireless connection is performed by wireless LAN connection. Network information necessary for the wireless LAN connection is stored in advance in the wireless LAN module unit 24 as network information dedicated to printer connection. Based on the network information, the IP address for the electronic camera 1 is automatically assigned by the electronic camera 1 itself so as to connect the wireless LAN module unit 24 and the dongle for printer 41 in ad hoc mode. The wireless LAN module unit 24 and the dongle for printer 41 are connected to each other without performing wireless LAN authentication and without encrypting the data.

When the wireless LAN module unit 24 and the dongle for printer 41 are thus connected to each other via wireless LAN, a predetermined message is displayed on the liquid crystal display 21. In response to this, the user presses a switch attached to the dongle for printer 41 so as to transmit device information related to the printer 42 from the dongle for printer 41 to the electronic camera 1. Based on the device information and the network information for printer connection described above, the electronic camera 1 creates profile of the printer 42 and writes the same in the memory 18 so as to store and save the same therein. In this manner, the profile information of the printer 42 is registered in the electronic camera 1.

3. Wireless LAN Connection

Figure 2:
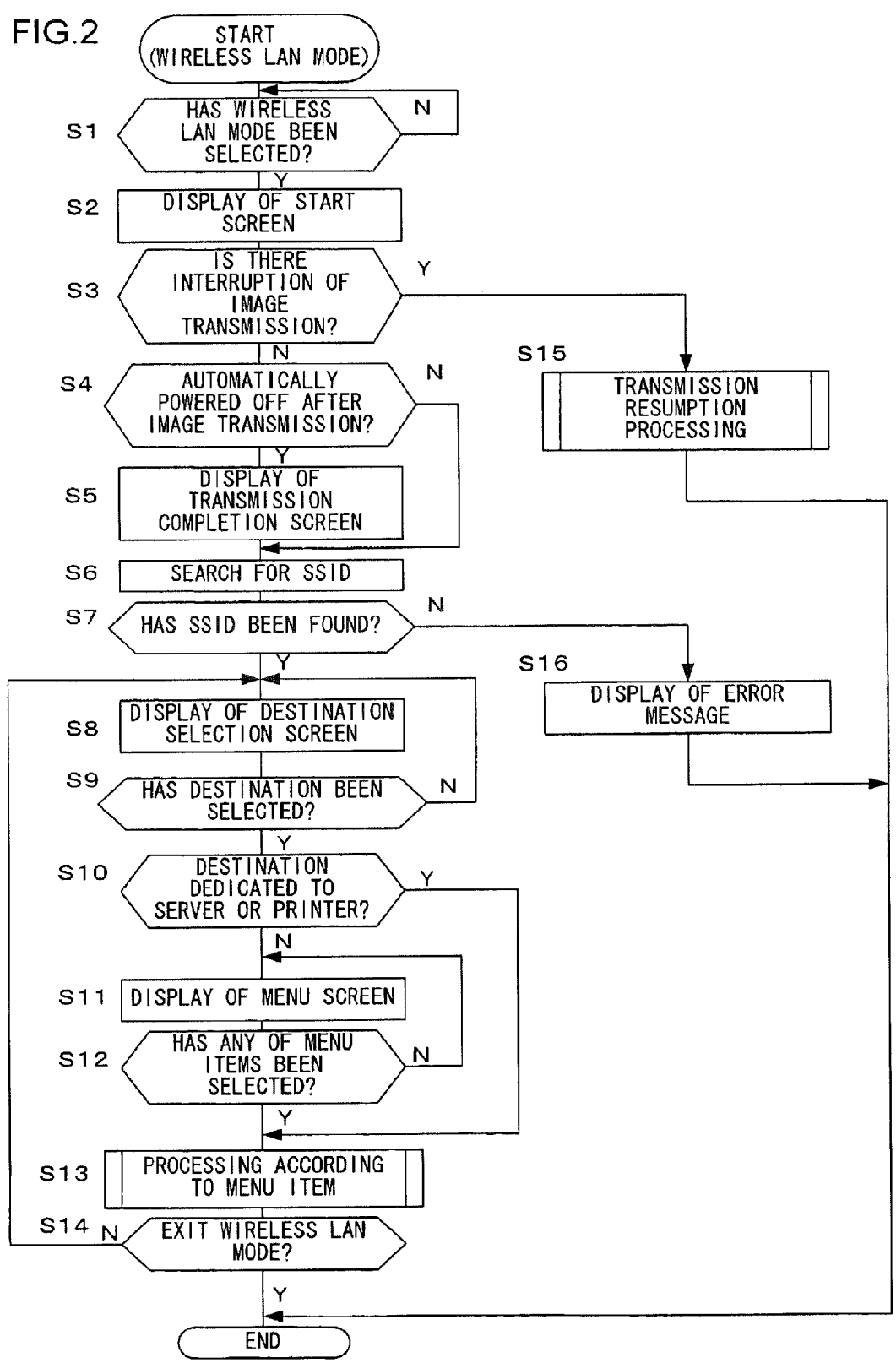
FIG. 2 is a flow chart of image transmission with an electronic camera connected to a destination via wireless LAN.
Figure 7:
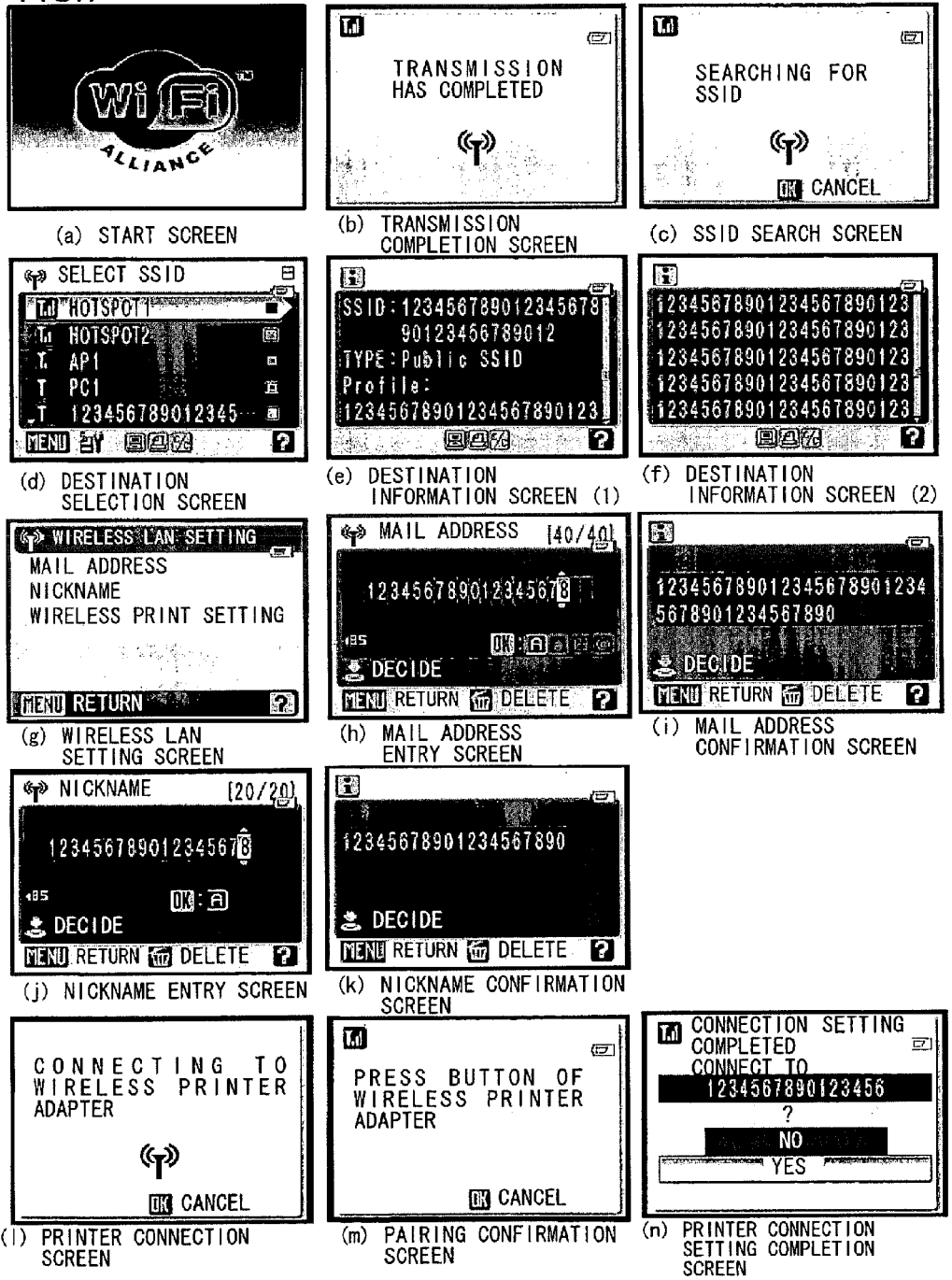
FIG. 7 is an illustration showing examples of a screen displayed on the electronic camera when the electronic camera is connected to a destination via wireless LAN so as to transmit an image thereto.

Operation for transmitting an image with the electronic camera 1 connected to a destination via wireless LAN based on the access point information or the profile information registered as described above will now be explained with reference to the flow chart of FIG. 2 and the examples of screens of FIG. 7. The flow chart of FIG. 2 shows the flow of processing which is performed by the control unit 17 of the electronic camera 1 when the electronic camera 1 is switched to the wireless LAN mode. FIG. 7 shows the examples of screens which are each displayed on the liquid crystal display 21 when the flow of processing presented in the flow chart of FIG. 2.

In a step S1 of FIG. 2, a decision is made as to whether or not the wireless LAN mode has been selected in the electronic camera 1. The flow remains in the step S1 until the wireless LAN mode is selected. The flow proceeds to a next step S2 when the wireless LAN mode is selected. This decision is performed in accordance with the operating state of the mode dial, which is a part of the operation unit 16. More specifically, when the user operates the mode dial so as to select a position of "wireless LAN", it is decided that the wireless LAN mode has been selected, the operation mode of the electronic camera 1 is switched to the wireless LAN mode, and the flow proceeds to the step S2.

In the step S2, a start screen that shows the start of execution of the wireless LAN mode is displayed on the liquid crystal display 21. At this time, a start screen as in FIG. 7(a) is displayed. In a step S3, a decision is made as to whether or not on the previous image transmission the image transmission was interrupted in the middle. If there was an interruption of the image transmission, the flow proceeds to a step S15 and performs transmission resumption processing. The content of the transmission resumption processing will be explained later with reference to the flow chart of FIG. 6. If there was not any interruption of the image transmission, the flow proceeds to a step S4.

In the step S4, a decision is made as to whether or not the electronic camera 1 was automatically powered off after the previous image transmission. The electronic camera 1 includes an "auto power off" function that causes the electronic camera 1 to be automatically powered off if no operation input is performed by the user for a predetermined time, e.g., three minutes. If the "auto power off" function was performed upon the previous image transmission, leaving the power of the electronic camera 1 off, the flow proceeds from the step S4 to a step S5.

In the step S5, a transmission completion screen is displayed on the liquid crystal display 21 so as to indicate that the previous image transmission has been successfully completed. At this time, a transmission completion screen as in FIG. 7(b) is displayed. After performing the step S5, the flow proceeds to a step S6. On the other hand, if it is decided that the electronic camera 1 was not automatically powered off in the step S4, the flow ignores the step S5 and proceeds to a step S6.

In the step S6, an SSID search is performed. By the SSID search, an SSID that corresponds to an access point, a PC, or a printer, each of which communicates with the wireless LAN module unit 24 via wireless LAN, is searched. At this time, any access point connected in infrastructure mode is an object of the SSID search, on the other hand, as for a dongle for printer or a PC connected in ad hoc mode, only that registered in the profile information is an object of the SSID search. Moreover, some access points include a function to keep their SSIDs a secret from a wireless terminal for which its own SSID has not been set. The search for the secret SSID is performed based upon SSID information registered in the access point information or in the profile information. In other words, only an access point whose SSID has been registered in the access point information or in the profile information is an object of the SSID search. When the operation mode of the electronic camera 1 is thus switched to the wireless LAN mode, an access point or a dongle for printer which can communicate wirelessly with the wireless LAN module unit 24 is searched. During this, an SSID search screen is displayed as shown in FIG. 7(c).

In the step S7, a decision is made as to whether or not an SSID was found in the step S6. If not a single SSID of a communicatable destination is found, the flow proceeds to a step S16. In this case, an error message is displayed on the liquid crystal display 21 in the step S16, and then the flow chart of FIG. 2 terminates. On the other hand, if at least one SSID is found, the flow proceeds to a step S8.

In the step S8, a destination selection screen for selecting the destination to which the electronic camera 1 is connected is displayed on the liquid crystal display 21. At this time, a destination selection screen is displayed as in FIG. 7(d). On the destination selection screen, a list of SSIDs that correspond to the access points, the PCs, or the printers which were found in the step S6 is displayed. It should be noted that, on the destination selection screen of FIG. 7(d), a box is displayed next to each of the SSIDs in the list. The boxes are color-coded with different colors by the type of SSID so that the user can easily identify the type of SSID. For example, in the case of an SSID which has not been registered in the access point information nor in the profile information, the box thereof is filled with black. The box of an SSID which has already been registered in the profile information, for example, is filled with green. The box of an SSID which has already been registered in the access point information, for example, is filled with orange. It should be noted that the colors referred herein are merely examples, therefore other colors may be used for color-coding. Or different-shaped graphics or the like may be used so as to enable the user to identify the type of SSID.

Moreover, on the destination selection screen of FIG. 7(d), as for the SSID on which the cursor is positioned, a function icon is displayed at the bottom of the screen so as to indicate the type of a function which is executable when the electronic camera 1 is connected thereto. There are three types of function icons in total, i.e., an icon indicating a PC connection function, an icon indicating a printer connection function, and an icon indicating a server connection function. For an SSID which has been registered either in the access point information or in the profile information, at least one of the three types of the function icons is displayed. On the other hand, for an unregistered SSID, either of the function icons is not displayed because which function is executable is unknown.

On the destination selection screen of FIG. 7(d), when the help button is pressed, a destination information screen as in FIG. 7(e) is displayed. On the destination information screen, the profile name of the device which is connected to the SSID on which the cursor is positioned. It should be noted that if the SSID is connected with a plurality of devices, the profile name of each of the devices is displayed. In the case where not all of the profile names are displayed on one screen, the profile names left behind are displayed as in FIG. 7(f) by operating the direction button so as to scroll down the screen. The help button is pressed once again so as to return to the destination selection screen of FIG. 7(d).

Furthermore, on the destination selection screen of FIG. 7(d), when the menu button is pressed, a wireless LAN setting screen is displayed as in FIG. 7(g). On the wireless LAN setting screen, settings are made such as mail address setting, nickname setting, and wireless print setting. When setting of a mail address is made, a mail address entry screen is displayed as in FIG. 7(h). The user enters his own mail address on the mail address entry screen so as to register the mail address of the transmitting person. It should be noted that when the help button is pressed upon the ge (step S513). And then, a mail address confirmation screen is displayed as in FIG. 7(i) for confirming the mail address which has been entered.

When setting of a nickname is made, a nickname entry screen is displayed as in FIG. 7(j). The user enters his own nickname on the nickname entry screen so as to register the nickname of the transmitting person. It should be noted that when the help button is pressed upon the nickname entry screen, a nickname confirmation screen is displayed as in FIG. 7(k) for confirming the nickname which has been entered.

When the image is transmitted from the electronic camera 1 to the mail transmission server 35, the nickname and the mail address of the transmitting person which have been registered in the above manner are transmitted from the electronic camera 1 to the mail transmission server 35 together with the image to be transmitted, and then used for creating a browse page or a notification mail in the mail transmission server 35.

When setting of a wireless print is made, the registration of the profile information is performed in the manner above described. More specifically, exemplifying the case where the wireless print setting for the printer 42 is performed, a wireless LAN connection in ad hoc mode is attempted between the electronic camera 1 and the dongle for printer 41 at the beginning. During this, a printer connection screen is displayed as in FIG. 7(l). When the electronic camera 1 and the dongle for printer 41 are connected to each other via wireless LAN, then a pairing confirmation screen is displayed as in FIG. 7(m). In response to this, the user presses the switch of the dongle for printer 41 so as to transmit device information related to the printer 42 from the dongle for printer 41 to the electronic camera 1. Upon receiving the device information, the electronic camera 1 registers the profile of the printer 42. Upon completion of the registration of the profile of the printer 42, a printer connection setting completion screen is displayed as in FIG. 7(n). When connection to the printer 42 is selected on the printer connection setting completion screen, the electronic camera 1 is connected to the printer 42 so as to start wireless print processing.

When the destination selection screen is displayed in the step S8, a decision is made in a next step S9 as to whether or not the destination to which the electronic camera 1 is connected has been selected. At this time, if any of the SSIDs in the list displayed on the destination selection screen displayed in the step S8 is selected by operation input made by the user, the access point, the dongle for printer, or the PC, each of which corresponding to the SSID is selected as the destination to which the electronic camera 1 is connected. Until the destination to which the electronic camera 1 is connected is thus selected, the flow returns to the step S8 so as to continue to display the destination selection screen. When the destination is selected, the flow proceeds to a step S10.

In the step S10, a decision is made as to whether or not the destination selected in the step S9 is a destination dedicated to server or printer. Here, the public access point 31 is a destination dedicated to server which is connected to either the online album server 34 or the mail transmission server 35. On the other hand, the dongle for printer 41 is a destination dedicated to printer which is connected to the printer 42. Therefore, if the SSID that corresponds to any of these destinations is selected by the user on the destination selection screen, it is decided that the destination dedicated to server or printer has been selected, and the flow proceeds to a step S13. On the other hand, the domestic access point 32 is connected to the PC 36, the PC 37, and the printer 38, as well as connected to the online album server 34 or the mail transmission server 35. The PC 51 is a destination dedicated to PC. Therefore, if the SSID that corresponds to any of these destinations is selected by the user on the destination selection screen, it is decided that the destination dedicated to server or printer has not been selected, and the flow proceeds to a step S11.

In the step S11, display of the menu screen that corresponds to the destination selected in the step S9 is performed. The menu screen displayed herein includes thereon a list of a variety of menu items which are executable upon the electronic camera 1 being connected to its destination. More specifically, if the domestic access point 32 is selected, a list of a variety of menu items for transmitting the image to one of the online album server 34, the mail transmission server 35, the PC 36, the PC 37, and the printer 38. On the other hand, if the PC 51 is selected, a list of a variety of menu items for transmitting the image to the PC 51.

It should be noted that the domestic access point 32 is connected with the online album server 34, the mail transmission server 35, the PC 36, the PC 37, and the printer 38. However, an access point that includes a network connection configuration other than that may be selected as a destination. In this case, the display configuration of the menu screen displayed in the step S11 varies depending on the network connection configuration of the selected access point.

More specifically, menu items displayed in a list on the menu screen vary depending on whether or not the selected access point is connected to the server. In other words, if an access point which is not connected via the Internet 33 to the online album server 34 nor the mail transmission server 35 is selected, menu items for transmitting an image to those servers are unnecessary, therefore they are not displayed on the menu screen. Similarly, if the selected access point is not connected to the PCs nor the printer, unnecessary menu items are not displayed on the menu screen. Accordingly, lists of menu items displayed on the menu screen are different from each other between in the case where the selected access point is connected to the destination and in the case where the selected access point is not connected to the destination.

The decision of the network connection configuration of an access point described above is performed based on either the access point information or the profile information. More specifically, when the access point information is registered, it is decided that a public access point that corresponds to the access point information is connected only to the online album server 34 or the mail transmission server 35. On the other hand, when the profile information is registered, it is decided what device is connected to an access point that corresponds to each of the SSIDs based upon information of the type of connection device and the SSID of wireless LAN displayed in the profile information.

Figure 8:
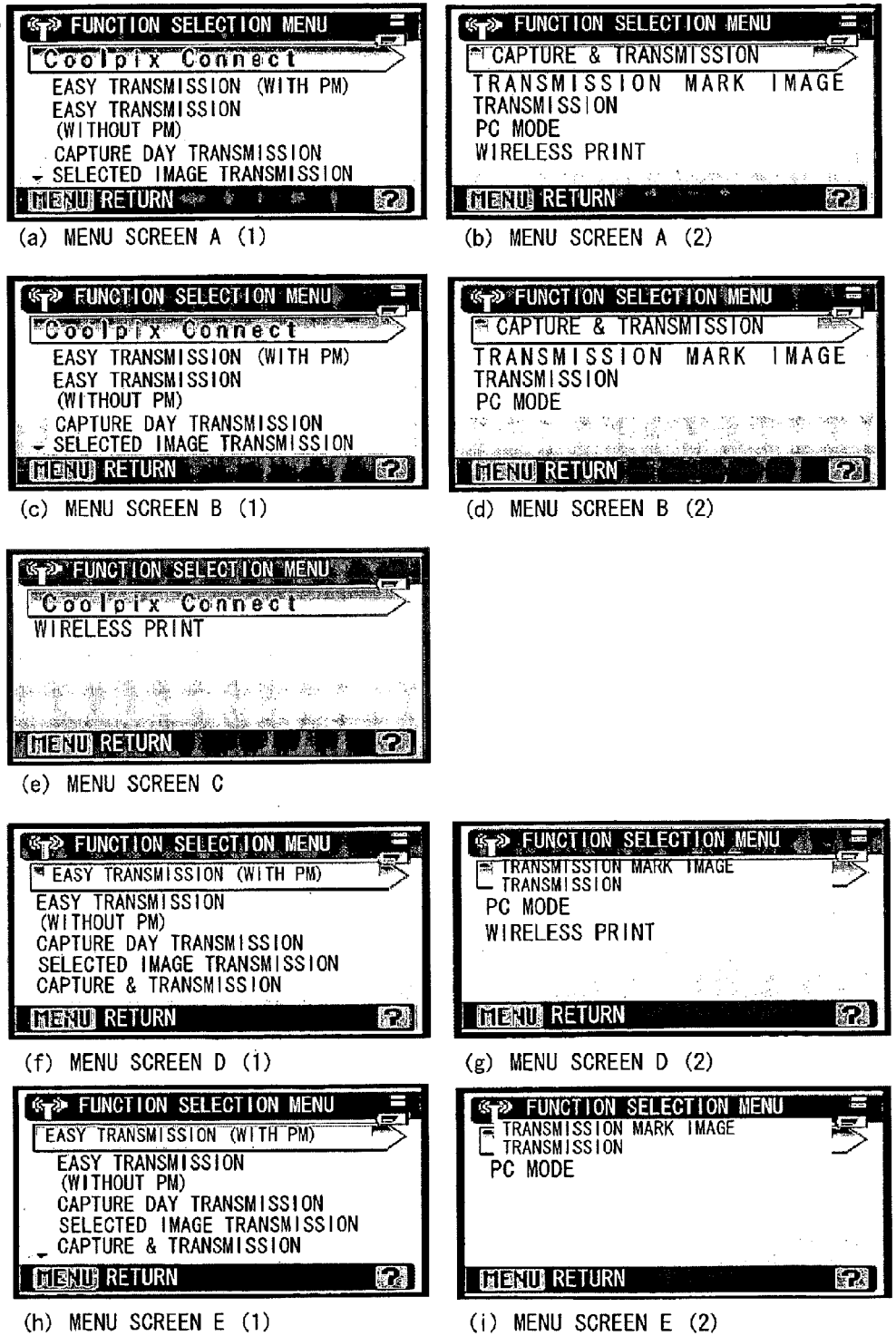
FIG. 8 is an illustration showing examples of a menu screen displayed on the electronic camera.

The screens in FIG. 8 each show an example of a menu screen displayed in the step S11. The menu screen A of FIGS. 8(*a*) and (*b*) is an example of a menu screen displayed when an access point to which, such as the domestic access point 32, each of the server, the PC, and the printer is connected is selected as a destination. Upon the menu screen A, a menu item "Coolpix Connect" for transmitting an image to the online album server 34 or the mail transmission server 35, a menu item for transmitting an image to the PC, and a menu item "Wireless Print" for transmitting an image to the printer are displayed. The menu item for transmitting an image to the PC is subdivided into items such as "Easy Transmission (with PM)", "Easy Transmission (without PM)", "Capture Day Transmission", "Selected Image Transmission", "Capture & Transmission", "Transmission Mark Image Transmission", and "PC Mode". It should be noted that the switch between the screen of FIG. 8(*a*) and the screen of FIG. 8(*b*) is performed by pressing the upper side or the lower side of the direction button. This applies to each of the menu screens explained below.

The menu screen B of FIGS. 8(*c*) and (*d*) is an example of a menu screen displayed when an access point to which the server and the PC are connected is selected as a destination. Upon the menu screen B, all the menu items described above except the one for transmitting an image to the printer are displayed. The menu screen C of FIG. 8(*e*) is an example of a menu screen displayed when an access point to which the server and the printer are connected is selected as a destination. Upon the menu screen C, all the menu items described above except the one for transmitting an image to the PC are displayed.

The menu screen D of FIGS. 8(*f*) and (*g*) is an example of a menu screen displayed when an access point to which the PC and the printer are connected is selected as a destination. Upon the menu screen D, all the menu items described above except the one for transmitting an image to the server are displayed. The menu screen E of FIGS. 8(*h*) and (*i*) is an example of a menu screen displayed when either an access point to which only the PC is connected or the PC which is connected in ad hoc mode is selected as a destination. Upon the menu screen E, all the menu items described above for transmitting an image to the PC are displayed.

It should be noted that if the destination dedicated to server is selected, from among the menu items described above, only "Coolpix Connect" for transmitting an image to the server corresponds to the menu item to be displayed on the menu screen. On the other hand, if the destination dedicated to printer is selected, from among the menu items described above, only "Wireless Printer" for transmitting an image to the printer corresponds to the menu item to be displayed on the menu screen. As described, there is thus only one menu item to be displayed on the menu screen. Therefore, if the display of a menu screen is unnecessary, as explained in the step S10, the flow ignores the step S11 and proceeds to the step S13 so as not to display the menu screen. As a result, the display of an unnecessary menu screen is omitted.

In a step S12, a decision is made as to whether or not any of the menu items was selected on the menu screen displayed in the step S11. Until any of the menu items is selected, the flow returns to the step S11 so as to continue to display the menu screen. When one of the menu items is selected, the flow proceeds to the step S13.

In the step S13, processing is performed in accordance with the menu item selected in the step S12. This processing causes the image to be transmitted from the electronic camera 1 to the destination corresponding to the menu item selected from among the servers, the PCs, or the printer. It should be noted that the content of the processing performed herein will be explained in detail below.

In a step S14, a decision is made as to whether or not to exit the wireless LAN mode. If it is decided to exit the wireless LAN mode, the flow chart of FIG. 2 terminates. On the other hand, if it is decided to continue the wireless LAN mode, the flow returns to the step S8, in which the destination selection screen is displayed again. This decision is performed depending on the operation result of the mode dial performed by the user after the processing is performed in the step S13. More specifically, if the mode dial remains on the position of "Wireless LAN", it is decided to continue the wireless LAN mode. On the other hand, if the mode dial is switched to another position, it is decided to exit the wireless LAN mode.

By the processing as described above performed in the wireless LAN mode, the image transmission from the electronic camera 1 is performed.

4. Image Transmission to Online Album Server

Next, the concrete content of the processing which is executed in the step S13 of FIG. 2 will be described in detail. First, the content of an online album server transmission processing which is executed when an image is transmitted to the online album server 34 will be described with reference to the flow chart in FIG. 3 and the examples of a screen in FIG.

Figure 3:
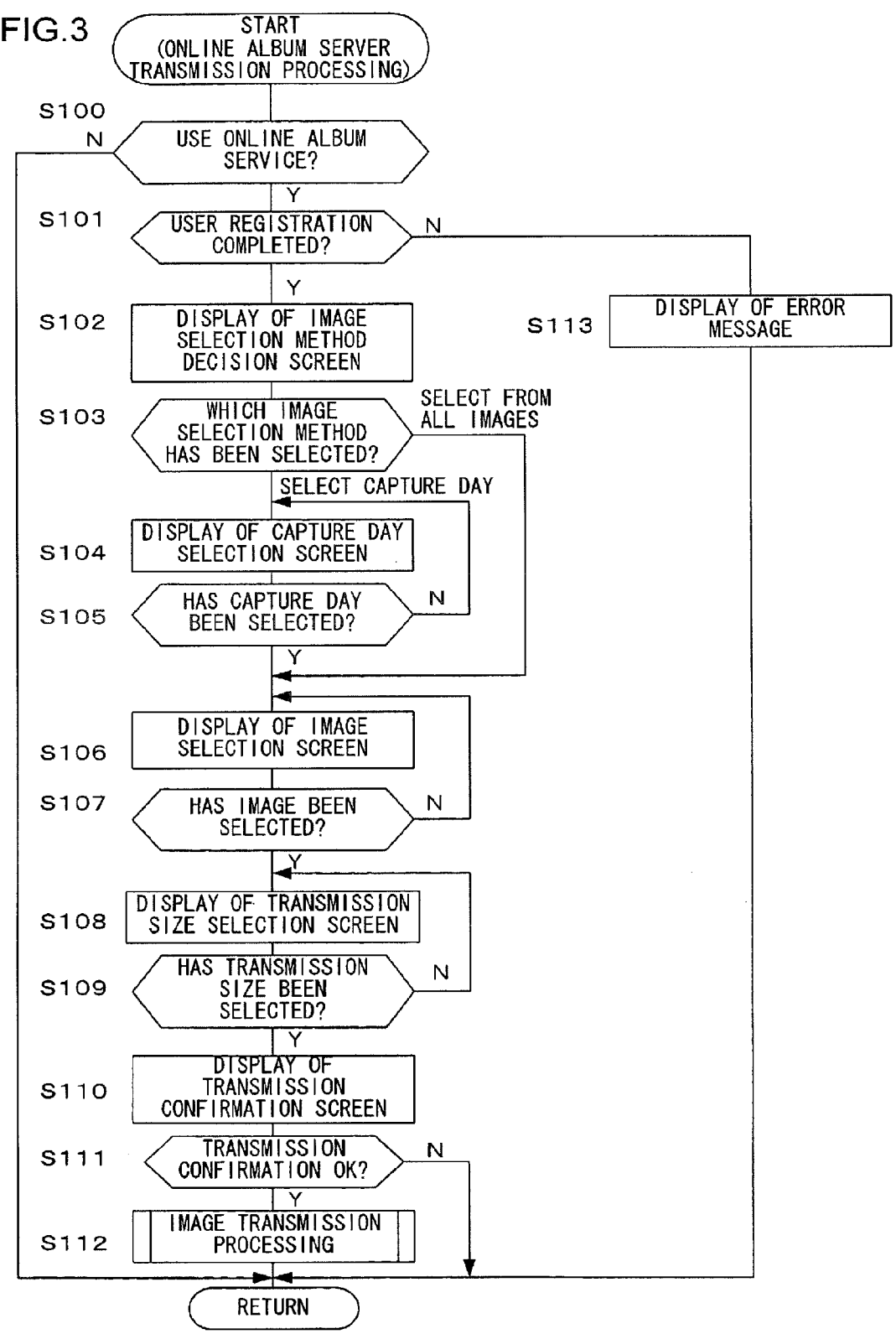
FIG. 3 is a flow chart of online album server transmission processing executed when an image is transmitted to an online album server.

9. As the menu screen in FIG. 9(a) shows, the flow chart in FIG. 3 is executed when the menu item "Coolpix Connect" is selected.

In a step S100, a decision is made as to whether or not to use the online album service. If it is decided to use the online album service, the flow proceeds to a next step S101. On the other hand, if it is decided not to use the online album service, in other words, if it is decided to use the mail transmission service, the flow chart of FIG. 3 terminates. In this case, the mail transmission server transmission processing is executed in accordance with the flow chart of FIG. 5 as described below. It should be noted that a decision on which service to use is performed in the manner described above.

In the step S101, a decision is made as to whether or not the user registration has already been completed in the online album server 34. If the user registration has already been completed, the flow proceeds to a next step S102. If the user registration has not yet been completed, the flow proceeds to a step S113. This decision is performed by referring to flag information which is internally set in the electronic camera 1 by performing the user registration. When the flow proceeds to the step S113, an error message is displayed on the liquid crystal display 21 and the flow chart of FIG. 3 terminates. In this case, an image transmission is not performed to the online album server 34.

In the step S102, an image selection method decision screen on which the selection method of an image to be transmitted by the electronic camera 1 is decided is displayed on the liquid crystal display 21. At this time, the image selection method decision screen is displayed as shown in 9(b). In the step S103, a decision is made as to which one of the image selection methods, "Select from All Images" or "Select Capture Day", was selected by operation of the user the image selection method decision screen displayed in the step S102. If "Select from All Images" is selected, the flow proceeds to a step S106. If "Select Capture Day" is selected, the flow proceeds to a step S104.

In the step S104, a capture day selection screen for selecting the capture day of the image to be transmitted is displayed on the liquid crystal display 21. At this time, a capture day selection screen is displayed as shown in FIG. 9(c). On this capture day selection screen, a list of capture days of all the captured images recorded in the electronic camera 1 is displayed. It should be noted that it is preferable that at this time, for each of the capture days, one of the captured images is selected as a representative image so as to display a list of thumbnail images, each of which is the representative image that has been shrunk, together with the capture days. This allows the user to confirm what image was captured on each of the capture days, thereby making the selection of a capture day easy.

In a step S105, a decision is made as to whether or not any of the capture days was selected by operation of the user on the capture day selection screen displayed in the step S104. Until one of the capture days is selected, the flow returns to the step S104 so as to continue to display the capture day selection screen. When one of the capture days is selected by the user and the enter button is pressed, the flow proceeds to the next step S106.

In the step S106, an image selection screen for selecting the image to be transmitted is displayed on the liquid crystal display 21. At this time, the image selection screen is displayed as shown in FIG. 9(d). On this image selection screen, a list of thumbnail images which are the captured images recorded in the electronic camera 1 that have been shrunk is displayed. At this time, if "Select Capture Day" is selected as an image selection method, a list of only those captured images that correspond to the capture day selected in the step S105 is displayed. On the other hand, if "Select from All Images" is selected as an image selection method, a list of all the captured images that are stored in the electronic camera 1.

In a step S107, a decision is made as to whether or not any of the images was selected by operation of the user on the image selection screen displayed in the step S106. Until one of the images is selected, the flow returns to the step S106 so as to continue to display the image selection screen. When one of the images is selected by the user and the enter button is pressed, the flow proceeds to a next step S108.

In the step S108, a transmission size selection screen for selecting an image size for transmission is displayed on the liquid crystal display 21. At this time, the transmission size selection screen is displayed as shown in FIG. 9(e). In this transmission size selection screen, one of the image sizes is selected by the user as a transmission size from among "Print Size", which is an image size suitable for printing on a printer, "PC Size", which is an image size suitable for displaying on a PC display, "TV Size", which is an image size suitable for displaying on a TV, and "Original", which is an original image size. When transmitting an image from the electronic camera 1 to the online album server 34, the image size is converted in accordance with the selected transmission size herein.

It should be noted that, of the four types of image sizes described above, "Print Size", "PC Size", and "TV Size" are the image sizes that are smaller than the original image size. In other words, when one of these image sizes is selected by the user, the original image size is converted into an image size smaller than that. Accordingly, by selecting these image sizes, the user can prevent the server capacity from being wasted. On the other hand, when "Original", which is the original image size, is specified by the user, the image size is not converted. This allows the user to transmit a captured image without degrading if necessary.

In a step S109, a decision is made as to whether or not any of the transmission sizes was selected by operation of the user on the transmission size selection screen displayed in the step S108. Until one of the transmission sizes is selected, the flow returns to the step S108 so as to continue to display the transmission size selection screen. When one of the transmission sizes is selected by the user, the flow proceeds to a next step S110.

In the step S110, a transmission confirmation screen for confirming with the user whether or not the transmission of the selected image may be started is displayed on the liquid crystal display 21. At this time, the transmission confirmation screen is displayed as shown in FIG. 9(f). In a next step S111, based upon the operation result by the user on the transmission confirmation screen displayed in the step S110, a decision is made as to whether or not the transmission confirmation result from the user is OK. If the transmission confirmation result is OK, more specifically, the user selects "Yes" on the transmission confirmation screen, the flow proceeds to a step S112. If not, more specifically, the user selects "No" on the transmission confirmation screen, the flow ignores the step S112 and the flow chart of FIG. 3 terminates. In this case, the image transmission to the online album server 34 is not performed.

In the step S112, an image transmission processing for transmitting the selected image is executed. The execution of the image transmission processing causes the electronic camera 1 and the online album server 34 to be connected to each other via wireless LAN, and causes the image selected by the user to be transmitted from the electronic camera 1 to the online album server 34. The concrete content of the image transmission processing will be described in detail below with reference to the flow chart presented in FIG. 4. After executing the processing of the step S112, the flow chart of FIG. 3 terminates.

Figure 10:
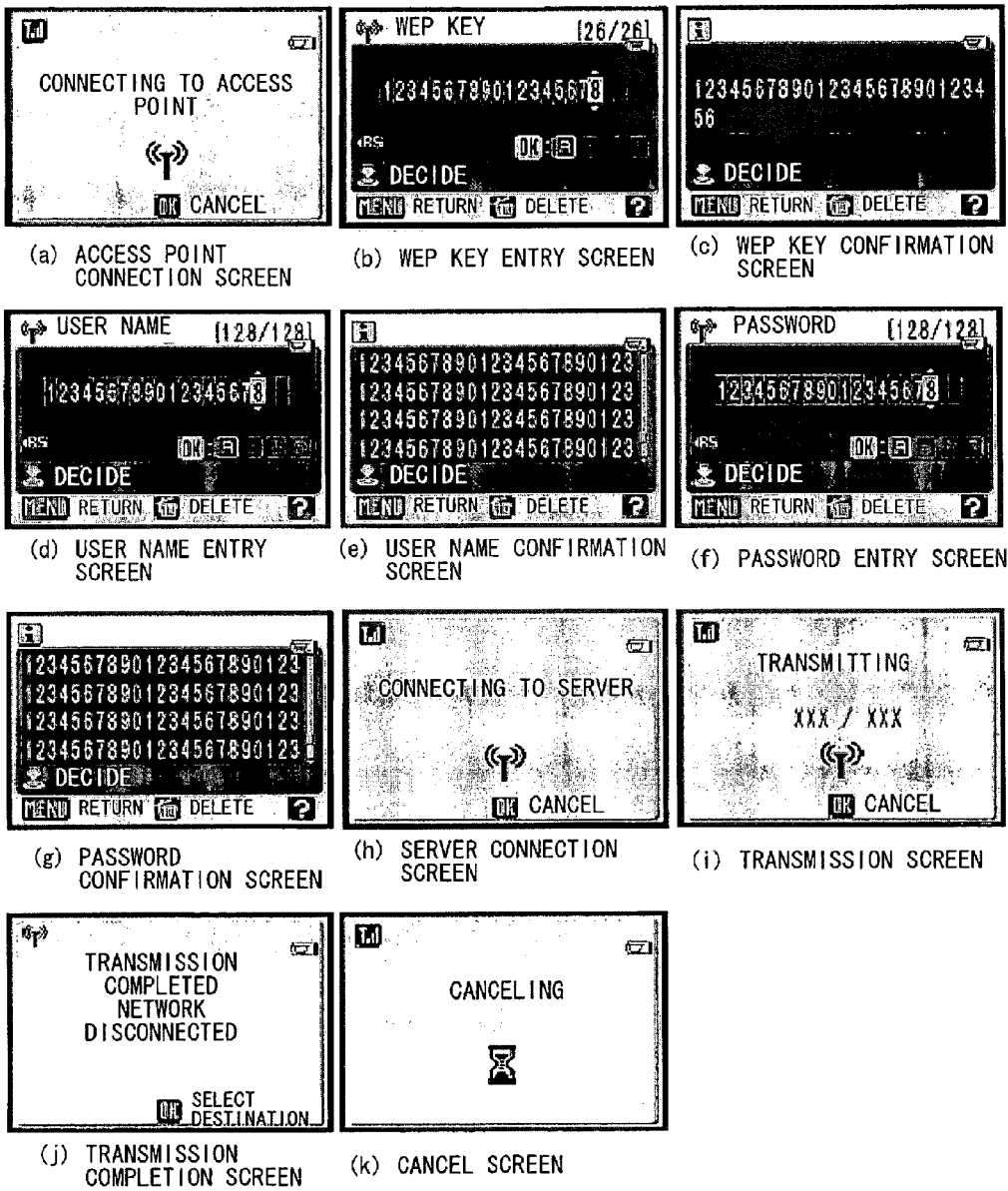
FIG. 10 is an illustration showing examples of a screen displayed on the electronic camera when the image transmission processing is executed.

The content of the image transmission processing executed in the step S112 of FIG. 3 will now be explained with reference to the flow chart of FIG. 4 and the examples of a screen shown in FIG. 10. In a step S121, the wireless LAN module unit 24 starts a wireless communication with an access point corresponding to the destination selected by the user in the step S9 of FIG. 2 so as to perform connection to the access point. During this, an access point connection screen is displayed as shown in FIG. 10(*a*). This causes the electronic camera 1 to be connected to the public access point 31 or the domestic access point 32 via wireless LAN.

In a step S122, a decision is made as to whether or not there is an input request for a WEP (Wired Equivalent Privacy) key, which is a cryptography key for connecting to the access point, from the access point connected in the step S121. It should be noted that in place of WEP key, a cryptography key in another cryptography form may be used. If there is an input request for a WEP key, the flow proceeds to a step S123. If not, the flow proceeds to a step S125.

In the step S123, a WEP key entry screen for entering a WEP key is displayed on the liquid crystal display 21. At this time, a WEP key entry screen is displayed as shown in FIG. 10(*b*). Operating the direction button or the like on the WEP key entry screen allows the user to input any WEP key into the electronic camera 1. It should be noted that if the help button is pressed at this time, a WEP key confirmation screen is displayed as shown in FIG. 10(*c*). The WEP key confirmation screen allows the user to confirm the WEP key which has been entered.

In a step S124, on the WEP key entry screen displayed in the step S123, a decision is made as to whether or not the correct WEP key has been entered by the user. Until the correct WEP key is entered, the flow returns to the step S123 so as to continue to display the WEP key entry screen. When the correct WEP key is entered, the flow proceeds to the step S125. The authentication of the WEP key is performed in this manner. It should be noted that the input of the WEP key can be cancelled by pressing a cancel button in the middle of entering.

It should be noted that even if the input of a WEP key is requested from the access point, in the case where the correct WEP key has been previously input to the access point, the content of the WEP key is stored in the electronic camera 1. In that case, therefore, using the stored WEP key so as to perform the decision of the step S124 allows the authentication of the WEP key to be performed without displaying the WEP key entry screen. Similarly, in the case where the content of the WEP key is stored in the access point information or in the profile information, using the WEP key allows the authentication of the WEP key to be performed without displaying the WEP key entry screen.

In the step S125, a decision is made as to whether or not there is a user authentication request for connecting to the access point, from the access point connected in the step S121. The user authentication request is performed in the public access point 31 in order to permit only a connection from a legitimate user, such as a user who has been applied in advance for the use or a user who has been obtained usage information for a limited time. If there is a user authentication request, the flow proceeds to a step S126. If not, the flow proceeds to a step S129.

In the step S126, a user name entry screen for entering a user name is displayed on the liquid crystal display 21. At this time, a user name entry screen is displayed as shown in FIG. 10(*d*). Operating the direction button or the like on the user name entry screen allows the user to input the user name obtained as usage information into the electronic camera 1. It should be noted that if the help button is pressed at this time, a user name confirmation screen is displayed as shown in FIG. 10(*e*). The user name confirmation screen allows the user to confirm the user name which has been entered. After the user name is entered, the flow proceeds to a step S127.

In the step S127, a password entry screen for entering a password is displayed on the liquid crystal display 21. At this time, a password entry screen is displayed as shown in FIG. 10(*f*). Operating the direction button or the like on the password entry screen allows the user to input the password obtained as usage information into the electronic camera 1. It should be noted that if the help button is pressed at this time, a password conformation screen is displayed as shown in FIG. 10(*g*). The password confirmation screen allows the user to confirm the password which has been entered. After the password is entered, the flow proceeds to a step S128.

In the step S128, a decision is made as to whether or not the correct user name and password have been entered by the user on the user name entry screen displayed in the step S126 and on the password entry screen displayed in the step S127. Until the correct user name and password are entered, the flow returns to the step S126 so as to continue to display the user name entry screen and the password entry screen. When the correct user name and password are entered, the flow proceeds to the step S129. The user authentication is performed in this manner. It should be noted that the input of the user name and password can be cancelled by pressing the cancel button in the middle of entering.

Upon the user authentication described above, predetermined information is exchanged between the electronic camera 1 and the access point, according to a procedure referred to as WISPr (Wireless Internet Service Provider roaming). It should be noted that similarly to the authentication of WEP key, also in the case of the user authentication, even if a user authentication is requested from the access point, in the case where the correct user name and password have been previously input to the access point, the contents of the user name and password are stored in the electronic camera 1. In that case, therefore, using the stored user name and the password so as to perform the decision of the step S128 allows the user authentication to be performed without displaying the user name entry screen or the password entry screen. Furthermore, in the case where the contents of the user name and the password are stored in the access point information or in the profile information, using the user name and the password allows the user authentication to be performed without displaying the user name input screen or the password input screen.

Upon the input request for a WEP key or the user authentication request from the access point, the authentication of the WEP key or the user authentication as explained above is performed as necessary. If the authentication result is correct, the connection to the access point is completed. Thus completion of the connection to the access point causes the electronic camera 1 to be connected via wireless LAN to the online album server 34 or the mail transmission server 35, either of which has been selected as the destination to which the image is transmitted.

In the step S129, a camera ID that is determined for the electronic camera 1 is transmitted to the destination server connected via wireless LAN, which is one of the online album server 34 and the mail transmission server 35. The camera ID is used for the destination server to perform the user authentication, and has a unique content for each of the electronic cameras 1. Therefore, based upon the camera ID transmitted from the electronic camera 1, the online album server 34 and the mail transmission server 35 can identify the user who performs the image transmission. In this manner, prior to the transmission of the image to the destination server, the camera ID for user authentication which is unique to each electronic camera 1 is transmitted from the electronic camera 1 to the destination server.

A camera ID can be determined for the electronic camera 1 in the following manner. For instance, a camera ID is determined based upon a fixed ID number that has been individually stored in advance in each of the electronic cameras. For the ID number, the serial number of each of the electronic cameras, for example, can be used. It should be noted that at this time it is preferable that the ID number of each of the electronic cameras is stored in encrypted form in order to prevent the user from abusing the camera ID of other person or from tampering the camera ID. Moreover, another ID number, which is calculated according to a predetermined algorithm and whose content is changed at a predetermined timing, may be used in combination with the ID number described above. In this case, it is required that the content of the camera ID is determined at the same timing using the same algorithm in the destination server. If this is done, it is possible to further prevent the camera ID from being abused or being tampered.

In a step S130, based upon the camera ID transmitted in the step S129, a decision is made as to whether or not the result of the server authentication performed by the destination server is OK. If the result of the server authentication is OK, the flow proceeds to a next step S131. On the other hand, if the result of the server authentication is not OK, more specifically, if the content of the transmitted camera ID is incorrect, or if the user who is specified by the camera ID is subject to service usage restriction, the flow proceeds to a step S133. In this case, in the step S133 an error message is displayed on the liquid crystal display 21, and then the flow chart of FIG. 4 terminates.

In the step S131, image information that represents the number of images to be transmitted, transmission size, and the like is transmitted to the destination server. Based upon this image information, in the destination server a decision is made as to whether or not the server capacity is sufficient. It should be noted that in the destination server the available server capacity is set in advance for each user. For example, in the online album server 34, each user can store images up to 100 megabytes in his own online album. The server capacity can be enhanced up to 1 gigabyte by the user performing a prescribed procedure. Furthermore, in the mail transmission server 35, each user can place images up to 100 megabytes in his own browse page. The browse page is automatically erased by the mail transmission server 35 after a predetermined period of time, e.g., two weeks.

In a step S132, a decision is made as to whether or not the server capacity is sufficient according to the decision result of the server capacity performed by the destination server based upon the image information transmitted in the step S131. If the decision that the server capacity is not sufficient is made by the destination server, the flow proceeds to the step S133, in which an error message is displayed on the liquid crystal display 21, and the flow chart of FIG. 4 terminates. On the other hand, if the decision that the server capacity is sufficient is made by the destination server, the flow proceeds to a step S134. It should be noted that during the processing of the above described steps S129 to S132 is executed, a server connection screen is displayed as shown in FIG. 10(h).

In the step S134, transmission of the image that was selected as an object of transmission either in the step S107 of FIG. 2 described above or in a step S208 of FIG. 5 described below is performed. During this, a transmission screen is displayed as shown in FIG. 10(i), on which the total number of images to be transmitted and the number of images that has been already transmitted are displayed. In a next step S135, a decision is made as to whether or not the transmission of the images has been completed. Until all the images that are objects of transmission are transmitted, the flow returns to the step S134 so as to continue to transmit the images. When the transmission of the images is completed, the flow proceeds to a step S136.

In the step S136, disconnection of the network established between the electronic camera 1 and the destination server is performed. At this time, the wireless LAN module unit 24 terminates the wireless communication with the access point selected as a destination. Thereby, the wireless LAN connection between the electronic camera 1 and the access point is disconnected. In a next step S137, the power supply to the wireless LAN module unit 24 is stopped, and the wireless LAN module unit 24 is turned off. In a next step S138, a transmission completion screen that indicates that the transmission of the image is completed is displayed on the liquid crystal display 21. During this, a transmission completion screen is displayed as shown in FIG. 10(j). After executing the step S138, the flow chart of FIG. 4 terminates.

The processing as explained above causes the electronic camera 1 and the online album server 34 or the mail transmission server 35 to be connected to each other via wireless LAN. And, an image selected by the user is transmitted from the electronic camera 1 to the online album server 34 or to the mail transmission server 35. It should be noted that if the cancel button is pressed before the image transmission, a cancel screen is displayed as shown in FIG. 10(k) and the flow chart of FIG. 4 terminates.

5. Image Transmission to Mail Transmission Server

Figure 5:
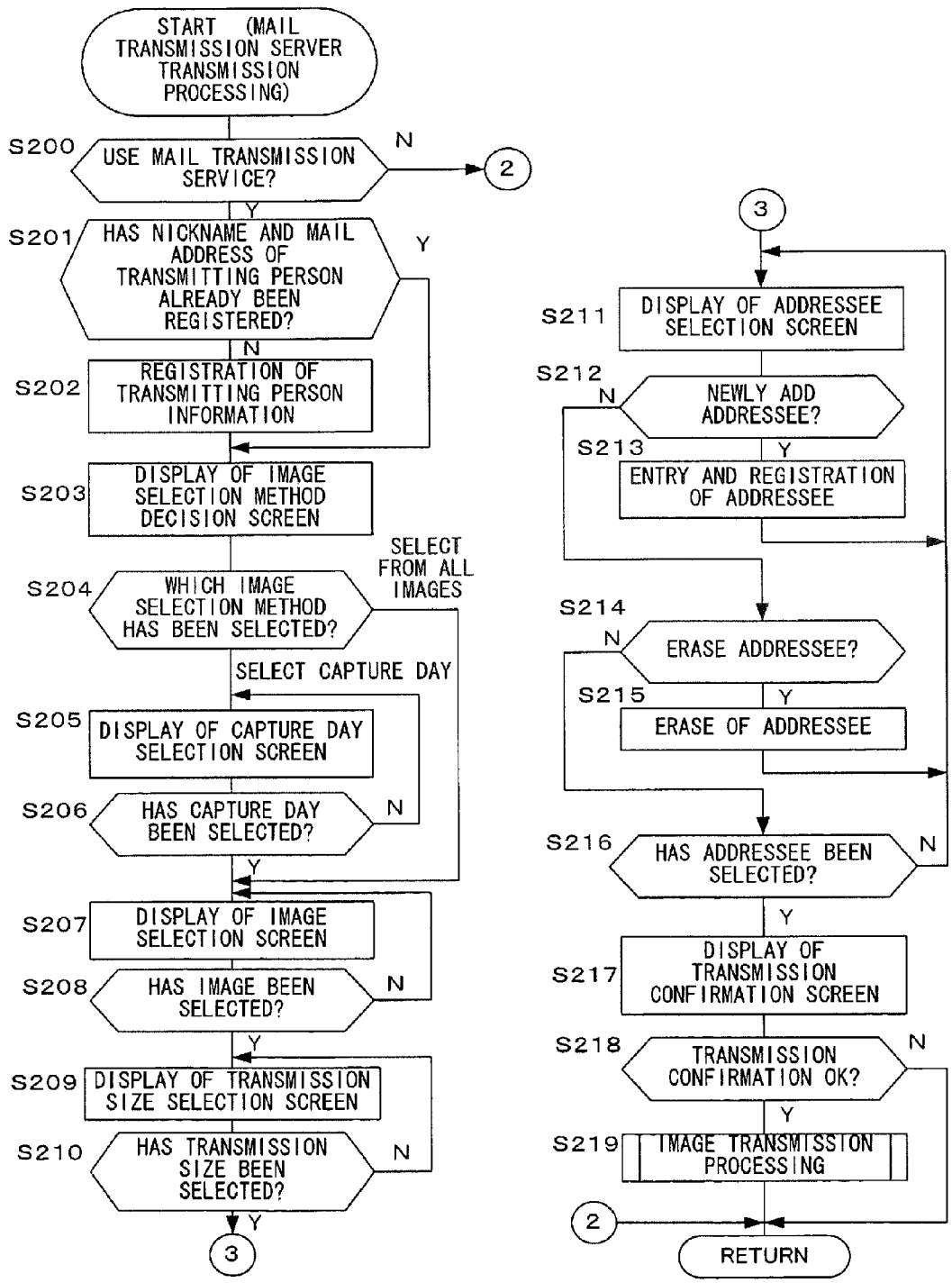
FIG. 5 is a flow chart of mail transmission server transmission processing that is executed when an image is transmitted to a mail transmission server.
Figure 11:
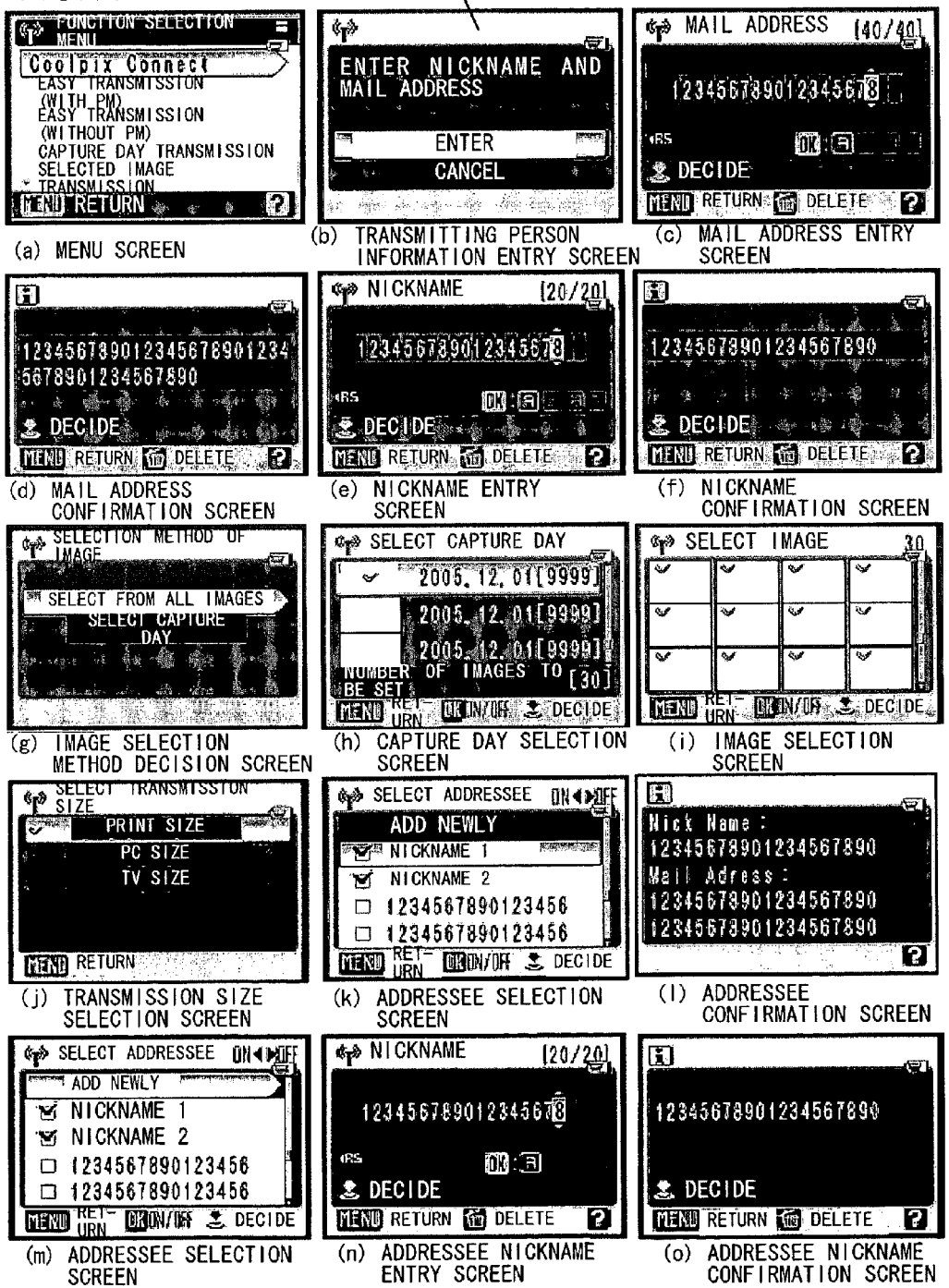
FIG. 11 is an illustration showing examples of a screen displayed on the electronic camera when the mail transmission server transmission processing is executed.
Figure 12:
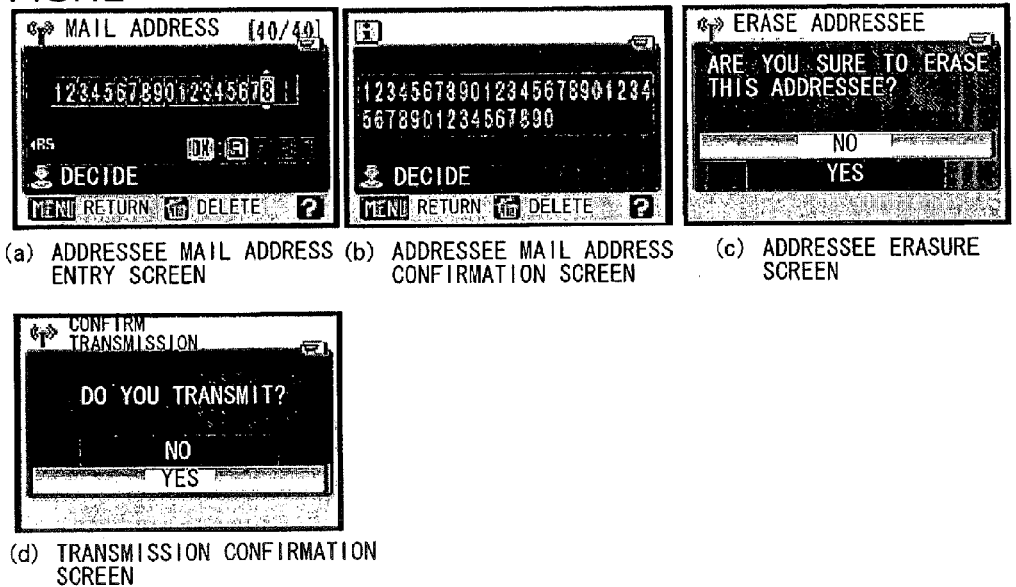
FIG. 12 is, as in FIG. 11, an illustration showing examples of a screen displayed on the electronic camera when the mail transmission server transmission processing is executed.

Next, from among the processing executed in the step S13 of FIG. 2, the content of the mail transmission server transmission processing that is executed when an image is transmitted to the mail transmission server 35 will be explained with reference to the flow chart of FIG. 5 and the examples of a screen of FIGS. 11 and 12. As shown in the menu screen of FIG. 11(a), the flow chart of FIG. 5 is executed when the menu item "Coolpix Connect" is selected.

In a step S200, a decision is made as to whether or not to use the mail transmission service. If the mail transmission service is used, the flow proceeds to a next step S201. On the other hand, if the mail transmission service is not used, in other words, if the online album service is used, the flow chart of FIG. 5 terminates. In this case, the online album server transmission processing is executed in accordance with the flow chart of FIG. 3 described above. Also in the step S200, similarly to the step S100 of FIG. 3, the decision regarding which service to use is performed in the above described manner.

In the step S201, a decision is made as to whether or not the nickname and mail address of the user, who is a transmitting person, has already been registered in the electronic camera 1 as transmitting person information. This registration of transmitting person information is performed by the user entering his own mail address and nickname on the mail address entry screen and the nickname entry screen displayed from the wireless LAN setting screen as mentioned above. If the transmitting person information has already been registered, the flow proceeds to a step S203. If it has not already been registered, the flow proceeds to a step S202.

In the step S202, the registration of the transmitting person information is performed. At this time, firstly a transmitting person information entry screen is displayed as shown in FIG. 11(b). If the user selects "Input" on this screen, then a mail address entry screen is displayed as shown in FIG. 11(c). The user can register the mail address of the transmitting person information by entering his own mail address on this mail address entry screen. It should be noted that if the help button is pressed on the mail address entry screen, a mail address confirmation screen for confirming the entered mail address is displayed as shown in FIG. 11(d).

Upon completion of the registration of the mail address, a nickname entry screen is displayed as in FIG. 11(e). By entering his own nickname on this nickname entry screen, the user can register the nickname of the transmitting person information. It should be noted that if the help button is pressed on the nickname entry screen, a nickname confirmation screen for confirming the entered nickname is displayed as in FIG. 11(f). After the nickname and the mail address of the transmitting person information are each registered in this manner, the flow proceeds to the step S203.

As has been explained above, in the case where the user instructs image transmission to the mail transmission server 35 in a state in which the transmitting person information has not been registered in the electronic camera 1, the flow proceeds from the step S201 to the step S202, in which, by displaying a transmitting person information entry screen as FIG. 11(b), the user is requested to register the transmitting person information. Then, after the transmitting person information is registered, the flow proceeds to the step S203 and executes subsequent processing. In this manner, in the case where transmitting person information has not been registered, it is arranged that unless the transmitting person information is registered the subsequent processing is not performed so as to inhibit the image transmission to the mail transmission server 35. Since this is done, at the time of image transmission it is possible to securely transmit the transmitting person information, which is necessary for creating a browse page in the mail transmission server 35, from the electronic camera 1 to the mail transmission server 35.

In the steps S203 to S210, similar processing is executed as that done in the steps S102 to S109 of FIG. 3. More specifically, in the step S203, the image selection method decision screen is displayed on the liquid crystal display 21 as shown in FIG. 11(g). In a step S204, a decision is made as to which any image selection method was selected by operation of the user on the image selection method decision screen displayed in the step S203. If "Select from All Images" is selected, the flow proceeds to a step S207. If "Select Capture Day" is selected, the flow proceeds to a step S205. In the step S205, the capture day selection screen is displayed on the liquid crystal display 21 as shown in FIG. 11(h). In a step S206, a decision is made as to whether or not any capture day was selected on the capture day selection screen displayed in the step S205. Until one of the capture days is selected, the flow returns to the step S205 so as to continue to display the capture day selection screen. When one of the capture days is selected, the flow proceeds to the step S207. In the step S207, the image selection screen is displayed on the liquid crystal display 21 as shown in FIG. 11(i). In a step S208, a decision is made as to whether or not any image was selected by operation of the user on the image selection screen displayed in the step S207. Until one of the images is selected, the flow returns to the step S207 so as to continue to display the image selection screen. When one of the images is selected, the flow proceeds to a step S209.

In the step S209, the transmission size selection screen is displayed on the liquid crystal display 21 as shown in FIG. 11(j). It should be noted that, unlike the transmission size selection screen displayed in the step S108 of FIG. 3, the transmission size selection screen displayed in the S209 is arranged so that "Original", which is for the original image size, can not be selected thereon. This prevents the user from specifying the original image size at the time of transmitting an image to the mail transmission server 35. This prevents a large-sized image from being transmitted from the electronic camera 1 with the original image size remaining the same, thereby preventing the server capacity from being wasted.

It should be noted that the same effect can be achieved by arranging the same as the above in order not to allow the user to instruct the original image size also at the time of transmitting an image to the online album server 34. More specifically, for at least one of the online album server 34 or the mail transmission server 35, when transmitting an image to the server, the user may not be allowed to specify the original image size so as to prevent the server capacity from being wasted.

In the step S210, a decision is made as to whether or not any of the transmission sizes was selected on the transmission size selection screen displayed in the step S209. Until one of the transmission sizes is selected, the flow returns to the step S209 so as to continue to display the transmission size selection screen. When one of the transmission sizes is selected by the user, the flow proceeds to a next step S211.

In the step S211, an addressee selection screen for selecting the addressee of the mail is displayed on the liquid crystal display 21. At this time, an addressee selection screen is displayed as shown in FIG. 11(k). On this addressee selection screen, a nickname list of friends and acquaintances whose mail addresses have been registered is displayed. The user can select any of them as an addressee of the mail. It should be noted that pressing the help button causes an addressee confirmation screen as shown in FIG. 11(l) to be displayed. On this addressee confirmation screen, the nickname and the mail address of the addressee on which the cursor is positioned is displayed.

In a step S212, a decision is made as to whether or not to newly add an addressee. On the addressee selection screen displayed in the step S211, when the cursor is moved to the position of "Newly Add" and the enter button is pressed as shown in the addressee selection screen of FIG. 11(m), a decision that an addressee is newly added is made and the flow proceeds to a step S213. On the other hand, in the event that an addressee is not newly added, the flow proceeds to a step S214.

In the step S213, entry and registration of a newly added addressee are performed. At this time, an addressee nickname entry screen is firstly displayed as shown in FIG. 11(n). By operating the direction button or the like on this addressee nickname entry screen, the user can enter the nickname of the friend or acquaintance that he desires to add as an addressee. It should be noted that if the help button is pressed at this time, an addressee nickname confirmation screen is displayed as shown in FIG. 11(o). This addressee nickname confirmation screen allows the user to confirm the entered addressee nickname.

Upon completion of the entry of the addressee nickname, an addressee mail address entry screen is then displayed as in FIG. 12(a). On this addressee mail address entry screen, the user can enter the mail address of the friend or acquaintance that he desires to add as an addressee. It should be noted that the help button is pressed at this time an addressee mail address confirmation screen is displayed as shown in FIG.

12(b). This addressee mail address confirmation screen allows the user to confirm the entered addressee mail address. In this manner, the nickname and mail address which have been newly entered are added to addressee and registered in the electronic camera 1. Upon completion of the registration, the flow returns to the step S211 so as to display the addressee selection screen.

It should be noted that the registration of addressee in the electronic camera 1 is not limited to the above case, in which it is performed in the step S213. In other words, by a method of selecting registration of addressee from a setup menu or the like, the user can register the addressee at any timing. Otherwise, in place of direct entry of addressee nickname and mail address into the electronic camera 1, it may be arranged that the addressee is registered using the nickname and the mail address entered into a PC which is connected to the electronic camera 1. Furthermore, this applied not only to the registration of the addressee but also to the transmitting person information registered in the step S202. More specifically, the user can register the transmitting person information at any timing or can register the transmitting person information using the nickname and the mail address entered into the PC which is connected to the electronic camera 1.

In the step S214, a decision is made as to whether or not to erase any of the addressees that have been already registered. If the delete button is pressed on the addressee selection screen displayed in the step S211, an addressee erasure screen is displayed as shown in FIG. 12(c). If "Yes" is selected on this screen, a decision that the addressee on which the cursor was positioned on the addressee selection screen is erased is made, and the flow proceeds to a step S215. In this case, after erasing the addressee in the step S215, the flow returns to the step S211 so as to display the addressee selection screen. On the other hand, if the addressee is not erased, the flow proceeds to a step S216.

In the step S216, a decision is made as to whether or not any of the addressees was selected on the addressee selection screen displayed in the step S211. Until one of the addressees is selected by operation of the user, the flow returns to the step S211 so as to continue to display the addressee selection screen. When one of the addressees is selected, the flow proceeds to a step S217. In the step S217, a transmission confirmation screen is displayed as shown in FIG. 12(d).

If "Yes" is selected on the transmission confirmation screen displayed in the step S217, a decision that transmission confirmation is OK is made in a next step S218, and the flow proceeds to a step S219. In the step S219, image transmission processing shown in the flow chart of FIG. 4 is performed in the above described manner. This causes the electronic camera 1 and the mail transmission server 35 to be connected to each other via wireless LAN, and causes the image selected by the user in the step S208 to be transmitted from the electronic camera 1 to the mail transmission server 35. At this time, together with the transmitted image, the addressee selected in the step S216 and the nickname and the mail address of the user registered as transmitting person information in the electronic camera 1 as described above are transmitted. After executing the step S219, the flow chart of FIG. 5 terminates. On the other hand, if "No" is selected on the transmission confirmation screen displayed in the step S217, a decision that transmission confirmation is not OK is made in the next step S218, the flow ignores the step S219 and the flow chart of FIG. 5 terminates. In this case, the transmission of the image is not performed.

6. Resumption of Image Transmission

Figure 6:
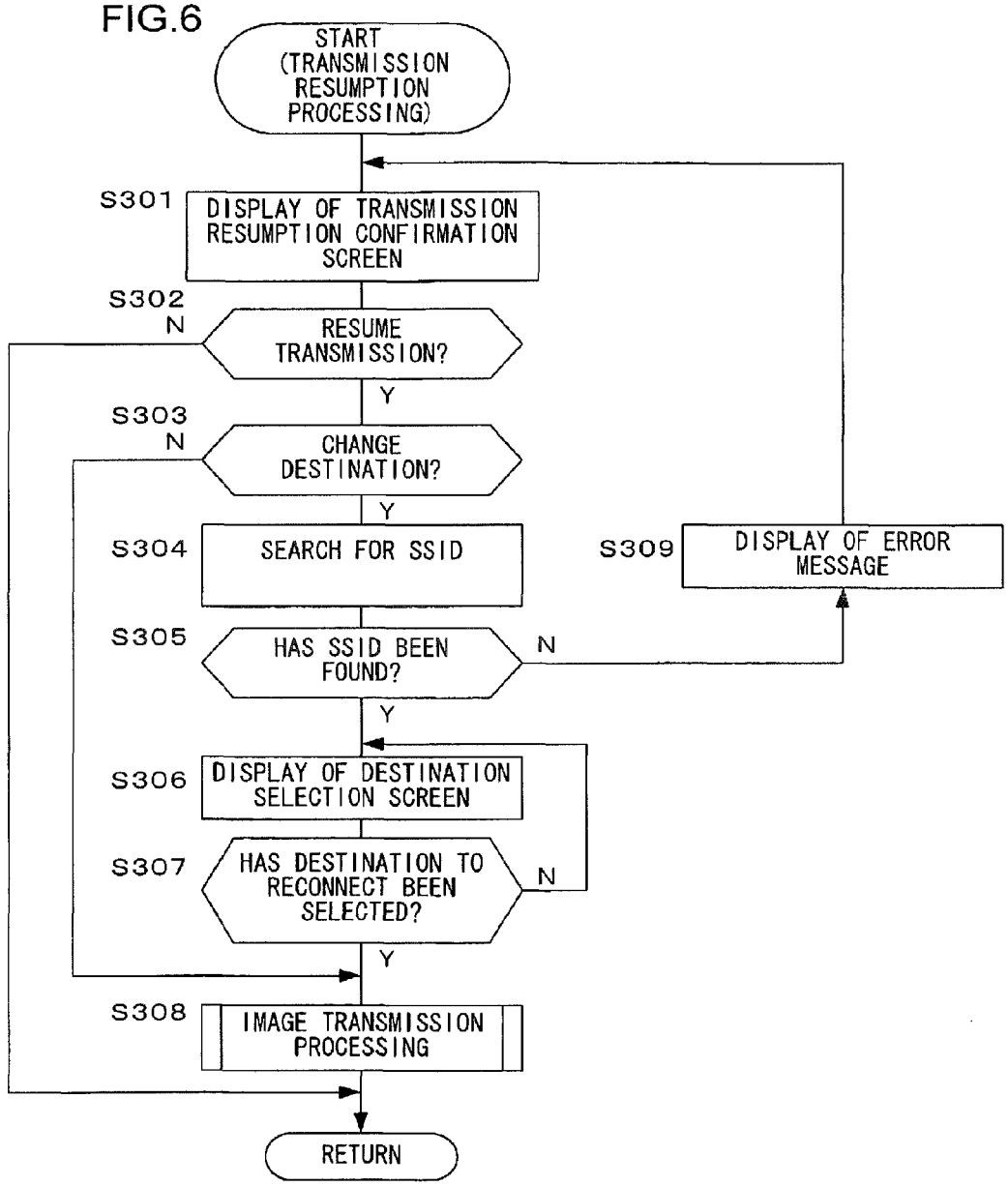
FIG. 6 is a flow chart of transmission resumption processing.
Figure 13:
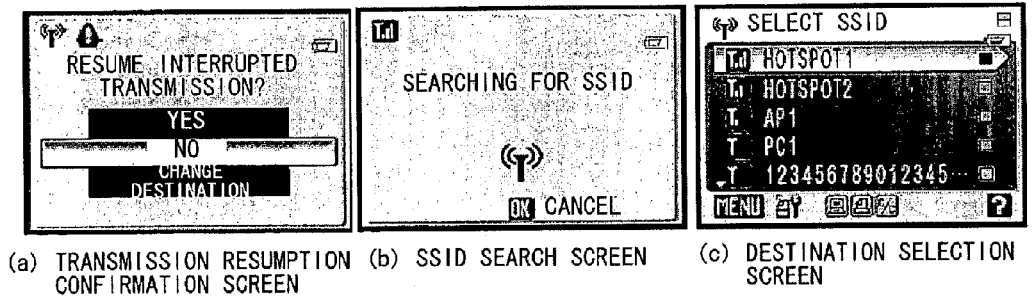
FIG. 13 is an illustration showing examples of a screen displayed on the electronic camera when the transmission resumption processing is executed.

Next, transmission resumption processing that is executed in the step S15 of FIG. 2 will be explained with reference to the flow chart of FIG. 6 and the examples of a screen of FIG. 13. In a step S301 of FIG. 6, a transmission resumption confirmation screen for confirming resumption of a transmission with the user is displayed on the liquid crystal display 21. At this time, a transmission resumption confirmation screen is displayed as shown in FIG. 13(a).

If "Yes" is selected on the transmission resumption confirmation screen displayed in the step S301, a decision that the transmission is resumed is made in a following step S302, and a decision that the destination is not changed is made in a subsequent step S303. In this case, the flow proceeds to a step S308, in which the image transmission processing shown in the flow chart of FIG. 4 is executed upon a previously untransmitted image. At this time, the electronic camera 1 is connected to the same destination as the previous destination. This causes the previously untransmitted image to be retransmitted. After executing the step S308, the flow chart of FIG. 6 terminates.

On the other hand, if "No" is selected on the transmission resumption confirmation screen displayed in the step S301, a decision that the transmission is not resumed is made in the following step S302. In this case, the step S308 is not executed and the flow chart of FIG. 6 terminates. Accordingly, the retransmission of the image is not performed.

Moreover, if "Change Destination" is selected on the transmission resumption confirmation screen displayed in the step S301, a decision that the transmission is resumed is made in the following step S302, and a decision that the destination is changed is made in the subsequent step S303. In this case, the flow proceeds to a step S304. In the step S304, similarly to the step S6 of FIG. 2, a search for the SSID of the destination available for a wireless LAN communication with the wireless LAN module unit 24 is performed. During this, an SSID search screen is displayed as shown in FIG. 13(b).

In the step S305, a decision is made as to whether or not an SSID was found in the step S304. If not a single SSID of a communicatable destination is found, the flow proceeds to a step S309. In this case, an error message is displayed on the liquid crystal display 21 in the step S309, and then the flow returns to the step S301 so as to display the transmission resumption confirmation screen again. On the other hand, if at least one SSID is found, the flow proceeds to a step S306.

In the step S306, by displaying a list of the SSIDs that were found in the step S305, a destination selection screen is displayed on the liquid crystal display 21 as shown in FIG. 13(c). In a next step S307, a decision is made as to whether or not any of the SSIDs was selected by operation of the user on the destination selection screen displayed in the step S306 as a destination for the electronic camera 1 to reconnect. Until a destination to reconnect is selected, the flow returns to the step S306 so as to continue to display the destination selection screen. When a destination to reconnect is selected, the flow proceeds to the step S308.

Figure 4:
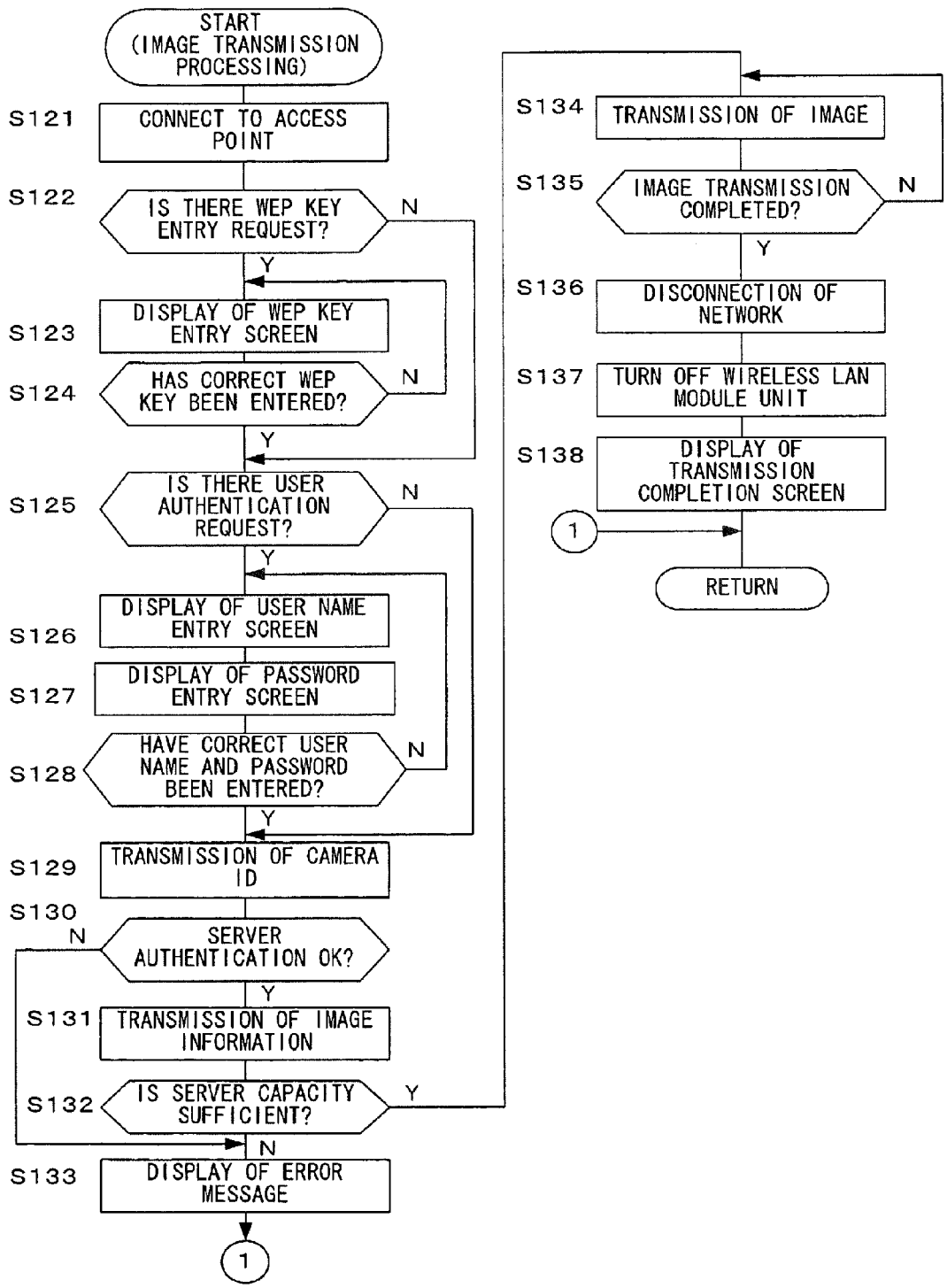
FIG. 4 is a flow chart of image transmission processing.

In the step S308, the image transmission processing shown in the flow chart of FIG. 4 is executed upon a previously untransmitted image. At this time, the electronic camera 1 is connected to the destination to reconnect selected in the step S307. This causes the previously untransmitted image to be retransmitted. After executing the step S308, the flow chart of FIG. 6 terminates. Execution of the transmission resumption processing in the above described manner causes the previously interrupted image transmission to be resumed and causes the then untransmitted image to be retransmitted.

7. Image Transmission to PC

Next, from among the processing executed in the step S13 of FIG. 2, operation for transmitting an image from the electronic camera 1 to the PC 36, 37, or 51 will be explained. On the menu screen displayed in the step S11 of FIG. 2, the above described menu items are each displayed as menu items for transmitting an image to the destination PC. More specifically, the menu items, which are "Easy Transmission (with PM)", "Easy Transmission (without PM)", "Capture Day Transmission", "Selected Image Transmission", "Capture & Transmission", "Transmission Mark Image Transmission", and "PC Mode", are each displayed on the menu screen. When one of these menu items is selected by operation of the user, the image is transmitted from the electronic camera 1 to the destination PC in the manner corresponding thereto.

Figure 14:
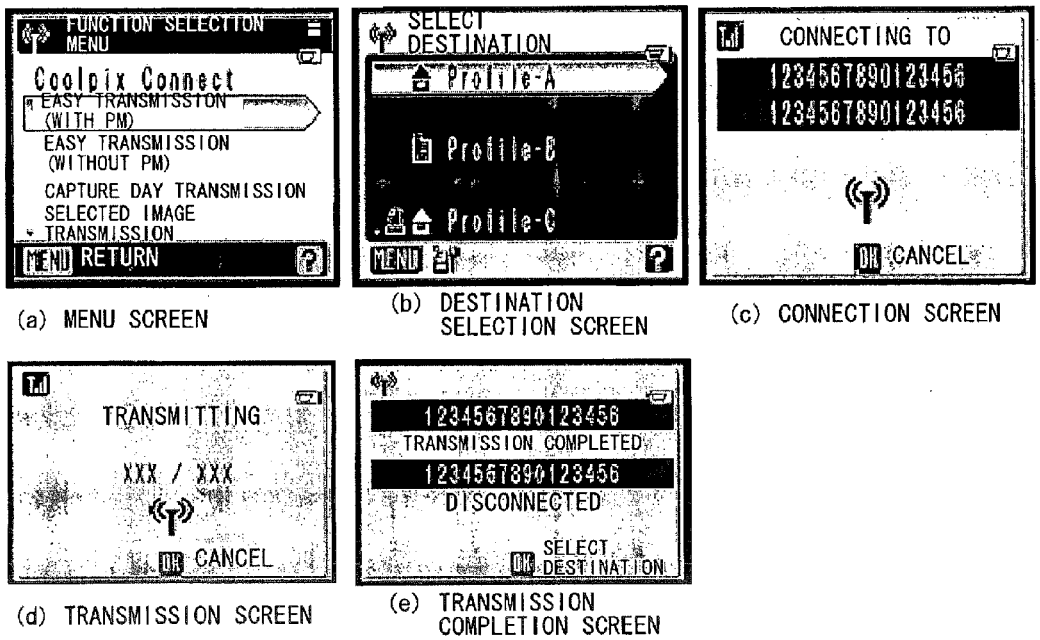
FIG. 14 is an illustration showing examples of a screen displayed on the electronic camera when an image transmission to a PC is performed in Easy Transmission.

As shown on a menu screen of FIG. 14(a), when "Easy Transmission (with PM)" is selected, an image transmission is performed in Easy Transmission. In this case, in order to select a destination PC, a destination selection screen is firstly displayed on the liquid crystal display 21 as shown in FIG. 14(b). On this destination selection screen, when one of the PCs is selected by the user as a destination, a connection screen is then displayed as shown in FIG. 14(c), and establishment of a channel to the selected PC is attempted. When the traffic channel to the PC is established, each of the image files stored in the electronic camera 1 and each of the image files stored in the PC are compared by the PC. Based upon this comparison result, an image file that is not stored in the PC is transmitted from the electronic camera 1 to the PC. During this, a transmission screen is displayed as shown in FIG. 14(d). Upon completion of transmission of the image, a transmission completion screen is displayed as shown in FIG. 14(e) and the traffic channel to the PC is disconnected. This allows an image which has not been transmitted to the PC that is selected as a destination to be distinguished from the images captured with the electronic camera 1, and causes the image to be transmitted to the destination PC.

It should be noted that also in the event that "Easy Transmission (without PM)" is selected, the similar processing is executed. The difference between "Easy Transmission (with PM)" and "Easy Transmission (without PM)" lies in whether or not a file (Pictmotion file), in which an image and a sound or an image effect are stored in combination in the electronic camera 1, is an object of transmission. More specifically, when "Easy Transmission (with PM)" is selected, a Pictmotion file is an object of transmission in addition to a normal image file. On the other hand, when "Easy Transmission (without PM)" is selected, only a normal image file is an object of transmission.

Figure 15:
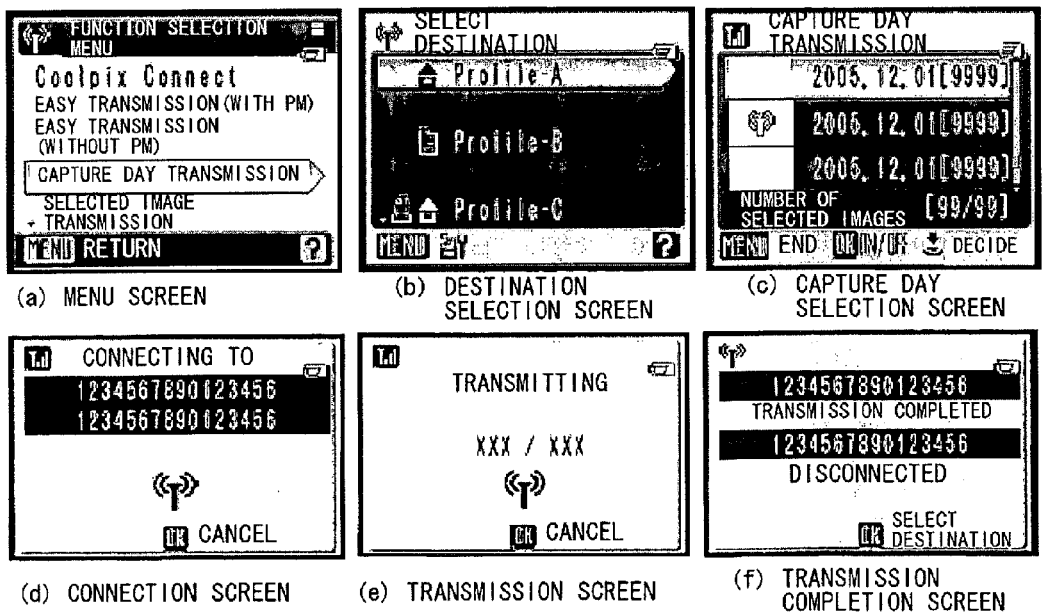
FIG. 15 is an illustration showing examples of a screen displayed on the electronic camera when an image transmission to a PC is performed in Capture Day Transmission.

As shown on the menu screen of FIG. 15(a), when "Capture Day Transmission" is selected, an image transmission is performed in Capture Day Transmission. Also in this case, as described above, in order to select a destination PC, a destination selection screen is firstly displayed on the liquid crystal display 21 as shown in FIG. 15(b). On this destination selection screen, when one of the PCs is selected by the user, a capture day selection screen is then displayed as shown in FIG. 15(c). On this capture day selection screen, when a capture day of the image that the user desires to transmit is selected by the user, a connection screen is displayed as shown in FIG. 15(d), and establishment of a channel to the PC selected as the destination is attempted. When the traffic channel to the PC is established, the image file of the selected capture day is transmitted from the electronic camera 1 to the PC. During this, a transmission screen is displayed as shown in FIG. 15(e). Upon completion of the image transmission, a transmission completion screen is displayed as shown in FIG. 15(f), and the traffic channel to the PC is disconnected. This causes the image of the capture day selected by the user from among the images captured with the electronic camera 1 to be transmitted to the destination PC.

As shown on the menu screen of FIG. 16(a), when "Selected Image Transmission" is selected, an image transmission is performed in Selected Image Transmission. Also in this case, as described above, in order to select a destination PC, a destination selection screen is firstly displayed on the liquid crystal display 21 as shown in FIG. 16(b). On this destination selection screen, when one of the PCs is selected by the user, an image selection screen is then displayed as shown in FIG. 16(c). On this image selection screen, when an image that the user desires to transmit is selected by the user, a connection screen is displayed as shown in FIG. 16(d), and establishment of a channel to the PC selected as the destination is attempted. When the traffic channel to the PC is established, the selected image file is transmitted from the electronic camera 1 to the PC. During this, a transmission screen is displayed as shown in FIG. 16(e). Upon completion of transmission of the image, a transmission completion screen is displayed as shown in FIG. 16(f), and the traffic channel to the PC is disconnected. This causes the image selected by the user from among the images captured with the electronic camera 1 to be transmitted to the destination PC.

As shown on the menu screen of FIG. 17(a), when "Capture & Transmission" is selected, an image transmission is performed in Capture & Transmission. Also in this case, as described above, in order to select a PC to be connected, a destination selection screen is firstly displayed on the liquid crystal display 21 as shown in FIG. 17(b). On this destination selection screen, when one of the PCs is selected by the user, a connection screen is then displayed as shown in FIG. 17(c), and establishment of a channel to the PC selected as the destination is attempted. When the traffic channel to the PC is established, a capture screen is then displayed as shown in FIG. 17(d), enabling the electronic camera 1 to capture an image. After performing the capture, a transmission confirmation screen is displayed as shown in FIG. 17(e) so as to cause the user to determine whether or not to transmit the captured image. If the user selects "Yes" on this screen, the captured image file is transmitted from the electronic camera 1 to the PC. During this, a transmission screen is displayed as shown in FIG. 17(f). Upon completion of transmission of the image, the capture screen of FIG. 17(d) is displayed again so as to continue to capture an image. This causes the image captured with the electronic camera 1 to be transmitted each time to the PC which is connected.

Figure 18:
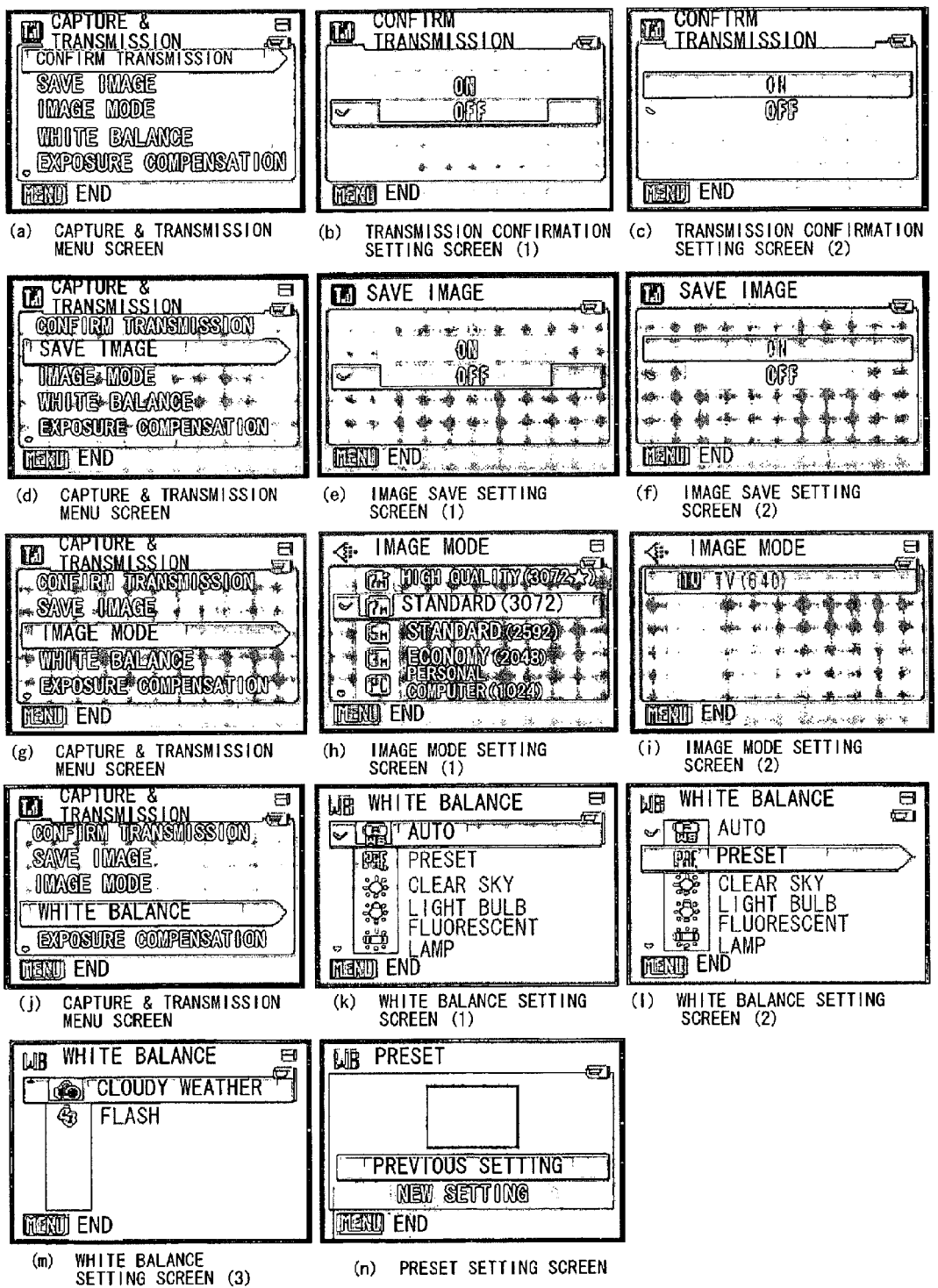
FIG. 18 is an illustration showing examples of a screen displayed on the electronic camera at various settings performed when an image is transmitted in capture & transmission.
Figure 19:
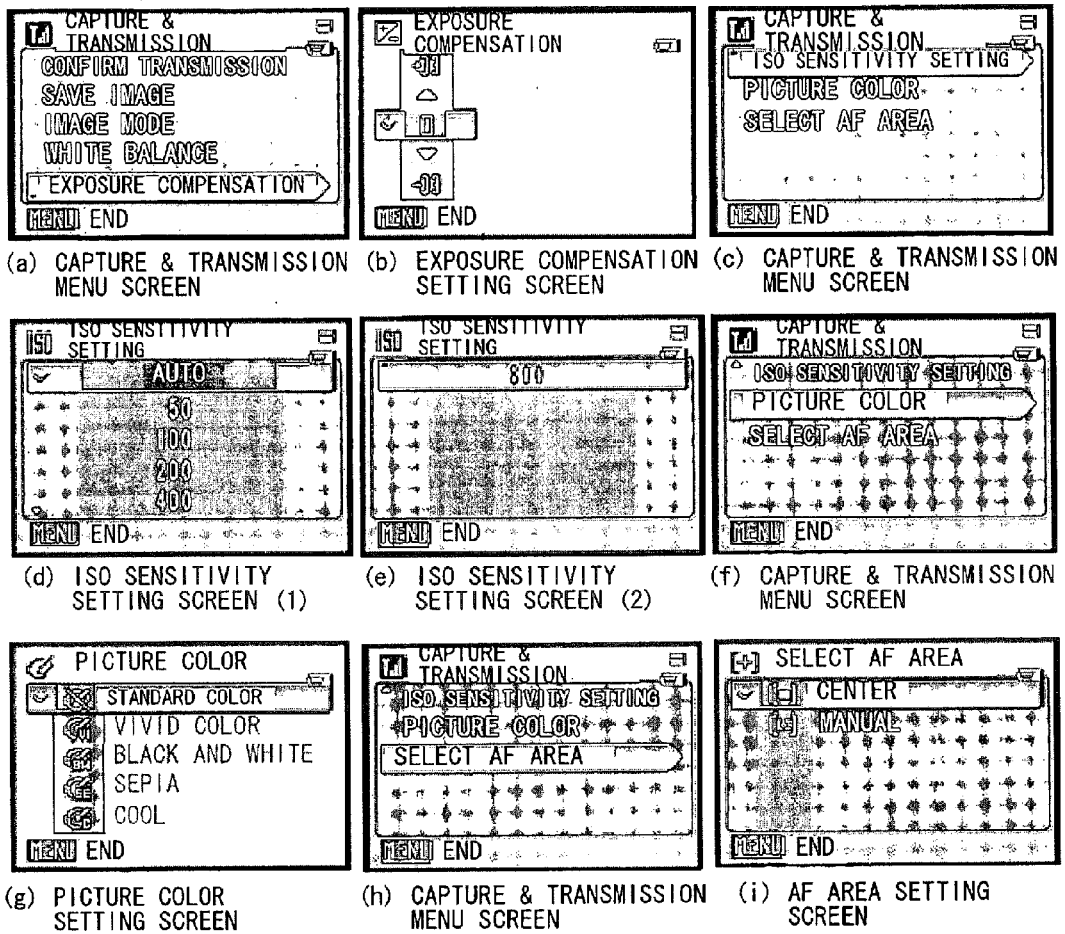
FIG. 19 is, as in FIG. 18, an illustration showing examples of a screen displayed on the electronic camera at various settings performed when an image is transmitted in capture & transmission.

It should be noted that at the time of the image transmission in the above described "Capture & Transmission", a variety of settings for capturing can be performed. The content of the settings will now be explained with reference to the examples of a screen of FIGS. 18 and 19. When the menu button is pressed by the user on the capture screen of FIG. 17(d), a Capture & Transmission menu screen is firstly displayed as shown in FIG. 18(a). On this menu screen, all of the following menu items are displayed, "Confirm Transmission", "Save Image", "Image Mode", "White Balance", and "Exposure Compensation". Moreover, moving the cursor downward on the screen causes the following menu items, "ISO Sensitivity Setting", "Picture Color", and "Select AF Area" to be displayed.

As shown in FIG. 18(a), when "Confirm Transmission" is selected, a transmission confirmation setting screen is displayed as shown in FIGS. 18(b) and (c). On this transmission confirmation setting screen, a setting is made as to whether or not to display a transmission confirmation screen as shown in FIG. 17(e) at the time of the image transmission. As shown in FIG. 18(b), when "OFF" is selected, an image is transmitted without displaying any transmission confirmation screen after capturing. On the other hand, as shown in FIG. 18(c), when "ON" is selected, the transmission confirmation screen is displayed after capturing so as to confirm with the user whether or not to transmit the image.

As shown on the Capture & Transmission menu screen of FIG. 18(d), when "Save Image" is selected, an image save setting screen is displayed as shown in FIGS. 18(e) and (f). On this image save setting screen, a setting is made as to whether or not to save the image having been transmitted to the PC in the electronic camera 1. As shown in FIG. 18(e), when "OFF" is selected, the transmitted image is not saved in the electronic camera 1. On the other hand, as shown in FIG. 18(f), when "ON" is selected, the transmitted image is saved in the electronic camera 1.

As shown on the Capture & Transmission menu screen of FIG. 18(g), when "Image Mode" is selected, an image mode setting screen is displayed as shown in FIGS. 18(h) and (i). On this image mode setting screen, an image size setting for transmitting is made. The image captured with the electronic camera 1 is transmitted to the PC, with its size converted into an image size which is selected herein.

As shown on the Capture & Transmission menu screen of FIG. 18(j), when "White Balance" is selected, a white balance setting screen is displayed as shown in FIGS. 18(k), (l), and (m). On this white balance setting screen, a white balance setting for capturing is made. The capture is performed in accordance with the white balance setting selected by the user herein. It should be noted that if "Preset" is selected as shown in FIG. 18(l), a preset setting screen is displayed as shown in FIG. 18(n). The white balance which is set by the user on this preset setting screen is stored in the electronic camera 1 as a preset value.

As shown on the Capture & Transmission menu screen of FIG. 19(a), when "Exposure Compensation" is selected, an exposure compensation setting screen is displayed as shown in FIG. 19(b). On this exposure compensation setting screen, a setting of exposure compensation amount for capturing is made. The capture is performed in accordance with the exposure compensation amount which is set by the user herein.

As shown on the Capture & Transmission menu screen of FIG. 19(c), when "ISO Sensitivity Setting" is selected, an ISO sensitivity setting screen is displayed as shown in FIGS. 19(d) and (e). On this ISO sensitivity setting screen, a setting of ISO sensitivity for capturing is made. The capture is performed in accordance with the ISO sensitivity which is selected by the user herein. It should be noted that if "Auto" is selected, the most appropriate ISO sensitivity is automatically set by the electronic camera 1 depending on the circumstances of the capture.

As shown on the Capture & Transmission menu screen of FIG. 19(f), when "Picture Color" is selected, a picture color setting screen is displayed as shown in FIG. 19(g). On this picture color setting screen, a setting of color tone for capturing is made. The capture is performed in the color tone according to the picture color which is selected by the user herein.

As shown on the Capture & Transmission menu screen of FIG. 19(h), when "Select AF Area" is selected, an AF area setting screen is displayed as shown in FIG. 19(i). On this AF area setting screen, a setting of AF area to be used for capturing is made. The AF area which is selected by the user herein is used for capturing.

At the time of image transmission in Capture & Transmission, by selecting one of the menu items displayed on the Capture & Transmission menu screen, the user can perform the variety of settings as explained above. This allows the user to set the most appropriate capturing status as he desires and to realize comfortable capturing.

Figure 20:
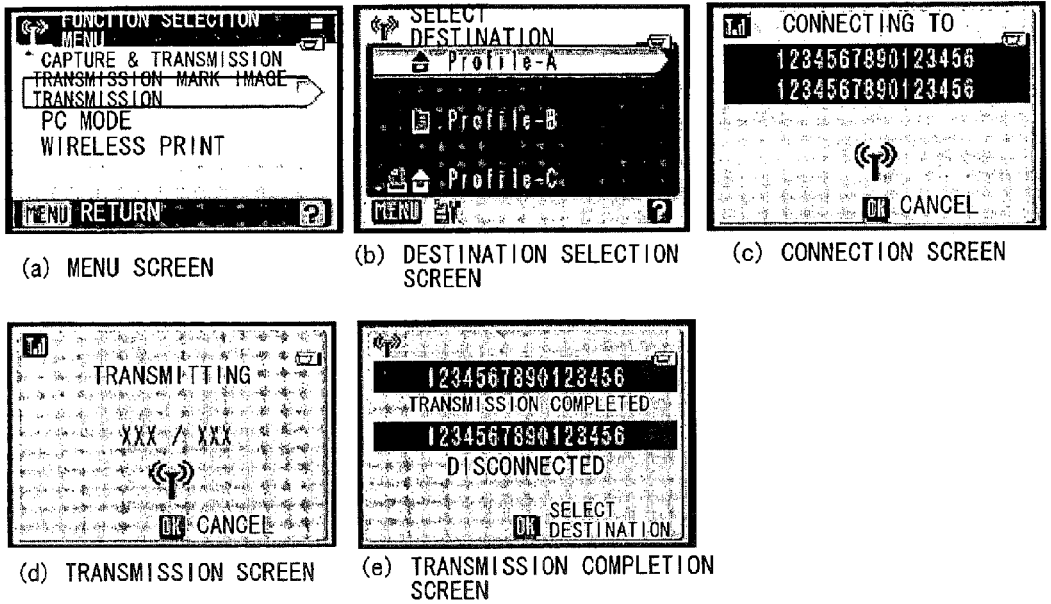
FIG. 20 is an illustration showing examples of a screen displayed on the electronic camera when an image transmission to a PC is performed in Transmission Mark Image Transmission.

As shown on the menu screen of FIG. 20(a), when "Transmission Mark Image Transmission" is selected, an image transmission is performed in Transmission Mark Image Transmission. Also in this case, as described above, in order to select a PC to be connected, a destination selection screen is firstly displayed on the liquid crystal display 21 as shown in FIG. 20(b). On this destination selection screen, when one of the PCs is selected by the user, a connection screen is then displayed as shown in FIG. 20(c), and establishment of a channel to the PC selected as the destination is attempted. When the traffic channel to the PC is established, among the image files recorded in the electronic camera 1, the image file to which a transmission mark has been set in advance by the user is transmitted from the electronic camera 1 to the PC. During this, a transmission screen is displayed as shown in FIG. 20(d). Upon completion of transmission of the image, a transmission completion screen is displayed as shown in FIG. 20(e) and the traffic channel to the PC is disconnected. This causes the image to which the transmission mark has been set in advance by the user among the images captured with the electronic camera 1 is transmitted to the PC of the destination.

Figure 21:
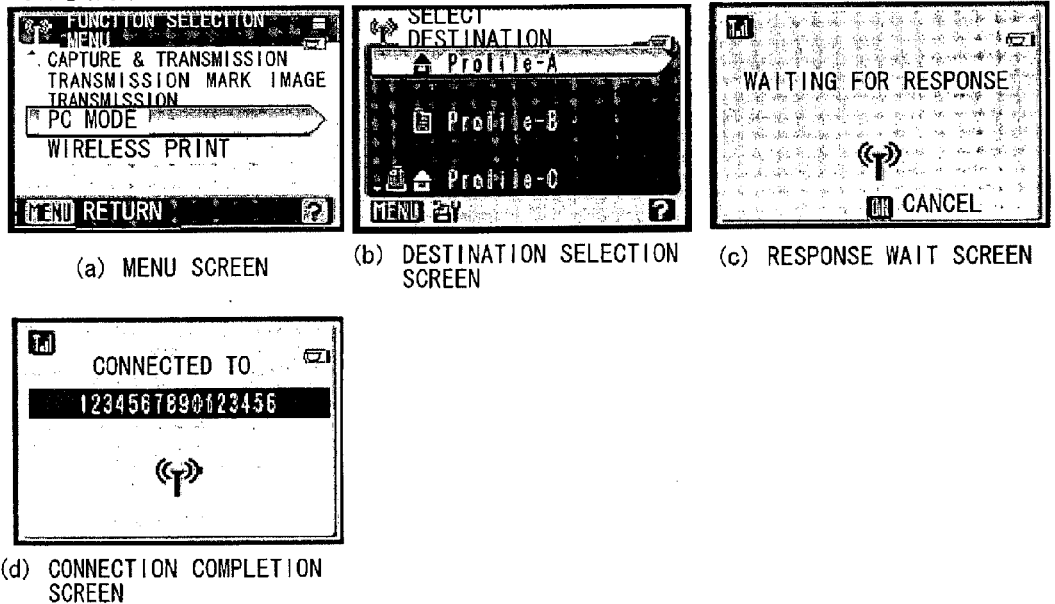
FIG. 21 is an illustration showing examples of a screen displayed on the electronic camera when an image transmission to a PC is performed in PC Mode.

As shown on the menu screen of FIG. 21(a), when "PC Mode" is selected, an image transmission is performed in PC Mode. Also in this case, as described above, in order to select a destination PC, a destination selection screen is firstly displayed on the liquid crystal display 21 as shown in FIG. 21(b). On this destination selection screen, when one of the PCs is selected by the user, a response wait screen is then displayed as shown in FIG. 21(c) and wait for a response from the selected PC. Upon receiving the response from the selected PC, a connection completion screen is displayed as shown in FIG. 21(d). And then, the electronic camera 1 is controlled by the destination PC. This causes the image that the user specified by operation of the PC to be transmitted from the electronic camera 1 to the destination PC.

As has been explained above, depending upon the menu item selected by the user, the variety of transmission methods allow images to be transmitted from the electronic camera 1 to the PCs 36, 37, or 51 connected thereto via wireless LAN.

8. Image Transmission to Printer

Next, from among the processing executed in the step S13 of FIG. 2, operation for transmitting an image from the electronic camera 1 to the printer 38 or 42 will be explained. As shown in the menu screen of FIG. 22(a), when "Wireless Print" is selected by operation of the user among the menu items of the menu screen displayed in the step S11, the destination selection screen is firstly displayed on the liquid crystal display 21 as shown in FIG. 22(b). On this the destination selection screen, when one of the printers is selected by the user as a destination, a connection screen is then displayed as shown in FIG. 22(c), and establishment of a channel to the selected printer is attempted. When the traffic channel to the printer is established, a wireless print menu screen is displayed as shown in FIG. 22(d).

Figure 22:
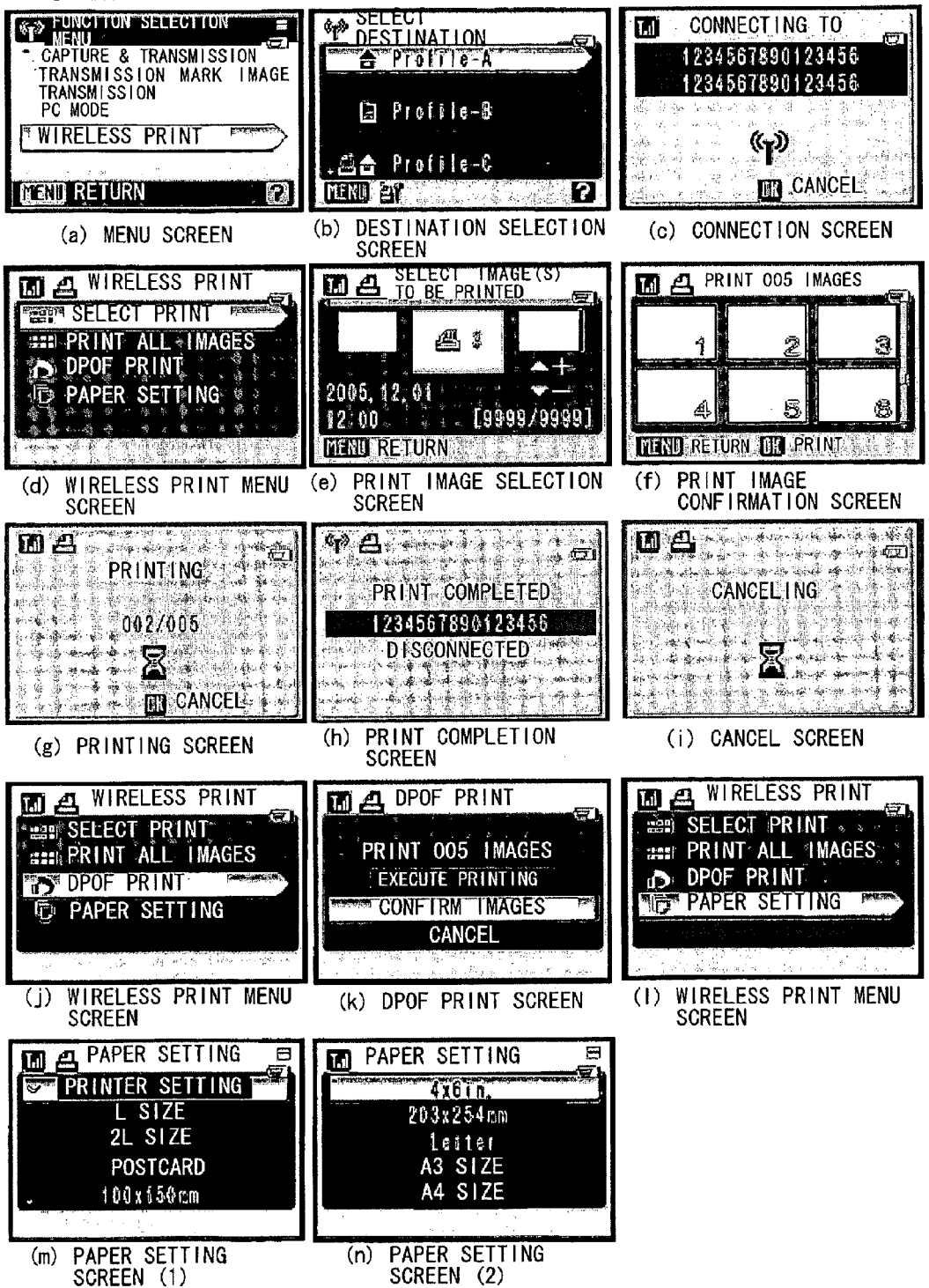
FIG. 22 is an illustration showing examples of a screen displayed on the electronic camera when an image transmission to a printer is performed.

On a wireless print menu screen of FIG. 22(d), the user can select one of the menu items from among "Select Print", "Print All Images", "Print DPOF", and "Paper Settings". If "Select Print" is selected, a print image selection screen is displayed as shown in FIG. 22(e). On this print image selection screen, the user can select an image that he desires to print. Upon completion of the selection of the image, a list of the images selected by the user is displayed on a print image confirmation screen shown in FIG. 22(f). On this print image confirmation screen, when the enter button is pressed by the user, the selected image is transmitted to the destination printer so as to start printing out the image. During this, a printing screen is displayed as shown in FIG. 22(g). Upon completion of the print, a print completion screen is displayed as shown in FIG. 22(*h*). It should be noted that if the cancel button is pressed in the middle of printing, the print of the image is cancelled. During this, a cancel screen is displayed as shown in FIG. 22(*i*).

When "Print All Images" is selected, all the images that are stored in the electronic camera 1 are transmitted to the destination printer so as to start printing out all the images. During printing, similarly to the above described case, the printing screen is displayed as shown in FIG. 22(*g*). Upon completion of the print, the print completion screen is displayed as shown in FIG. 22(*h*). In the case where the cancel button is pressed in the middle of printing, the print of the image is cancelled and the cancel screen is displayed as shown in FIG. 22(*i*).

As shown on a wireless print menu screen of FIG. 22(*j*), when "Print DPOF" is selected, a DPOF print screen is displayed as shown in FIG. 22(*k*). On this DPOF print screen, when "Execute Print" is selected by the user, information about the image targeted for printing and the number of prints that has been set by the user in advance for the electronic camera 1 is transmitted to the destination printer according to a scheme referred to as DPOF (Digital Print Order Format). This causes the image to be printed out. It should be noted that by selecting "Confirm Image" on the DPOF print screen of FIG. 22(*k*), the user can confirm the image before starting the print.

As shown on a wireless print menu screen of FIG. 22(*l*), when "Paper Settings" is selected, a paper setting screen is displayed as shown in FIGS. 22(*m*) and (*n*). On this paper setting screen, setting of paper used to print in the destination printer is made. The print out of the image is performed in accordance with the paper setting selected by the user herein.

As has been explained above, an image is transmitted from the electronic camera 1 to the printer 38 or 42 connected thereto via wireless LAN. The image transmitted in the above manner is printed out by the destination printer in a variety of manners of printing in accordance with the menu items selected by the user on the wireless print menu screen.

9. Error Screen

Figure 23:
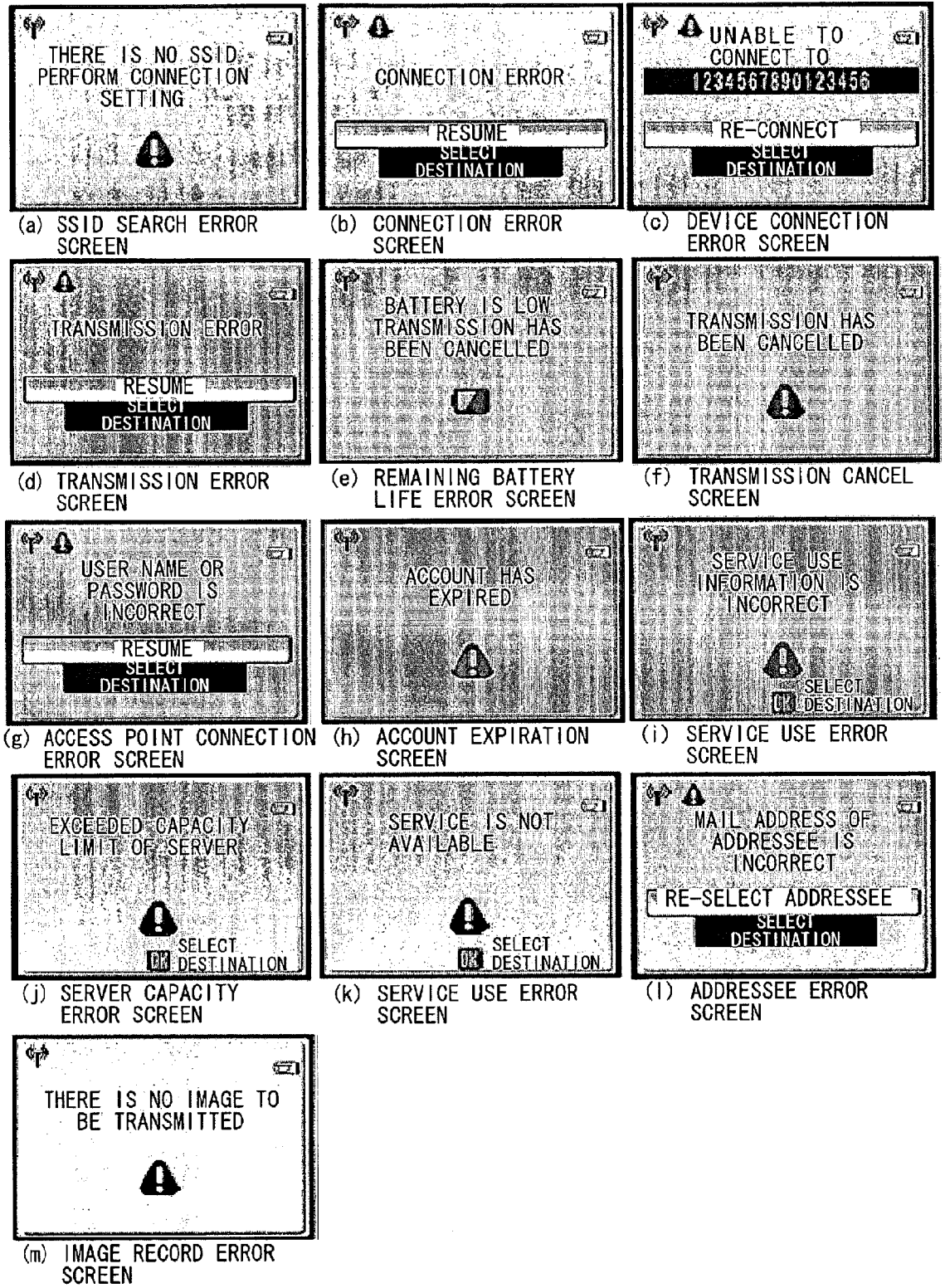
FIG. 23 is an illustration showing examples of an error screen displayed on the electronic camera.

Next, a variety of error screens displayed by the electronic camera 1 will be explained with reference to examples of a screen of FIGS. 23 and 24. FIG. 23(*a*) is an example of an SSID search error screen which is to be displayed when a search for an SSID ends up failing to find any SSID that can communicate with the electronic camera 1 via wireless LAN. This error screen is displayed in the step S16 of FIG. 2 or in the step S309 of FIG. 6.

FIG. 23(*b*) is an example of a connection error screen which is to be displayed when the electronic camera 1 failed to be connected to the access point or failed to be connected to the server selected as a destination. FIG. 23(*c*) is an example of a device connection error screen which is to be displayed when the electronic camera 1 failed to be connected to the PC or the printer selected as a destination. On this device connection error screen, the profile name of the device to which the electronic camera 1 failed to be connected is displayed.

FIG. 23(*d*) is an example of a transmission error screen which is to be displayed when transmission of the image is interrupted due to the communication of wireless LAN is disconnected or the similar reason. FIG. 23(*e*) is an example of a remaining battery life error screen which is to be displayed when transmission of the image is interrupted due to low battery during image transmission. FIG. 23(*f*) is an example of a transmission cancel screen which is to be displayed when transmission is cancelled by the user inputting a cancel operation during image transmission.

FIG. 23(*g*) is an example of an access point connection error screen which is to be displayed when the user name or the password entered in response to the user authentication request from the access point is incorrect. FIG. 23(*h*) is an example of an account expiration screen which is to be displayed when the account expires. These error screens are displayed when a decision that the correct user name and the pass word were not entered is made in the step S128 of FIG. 4.

FIG. 23(*i*) is an example of a service use error screen which is to be displayed when the camera ID transmitted from the electronic camera 1 is incorrect. This error screen is displayed in the step S133 when a decision that the server authentication is not OK is made in the step S130 of FIG. 4. FIG. 23(*j*) is an example of a server capacity error screen which is to be displayed when the amount of data of the image to be transmitted from the electronic camera 1 to the server exceeds capacity limit of the server. This error screen is displayed in the step S133 when a decision that the server capacity is not sufficient is made in the step S132 of FIG. 4.

FIG. 23(*k*) is an example of a service use error screen which is to be displayed when the server is not available due to maintenance or a similar reason. FIG. 23(*l*) is an example of an addressee error screen which is to be displayed when the mail address of an addressee that the user specifies at the time of using the mail transmission service is incorrect. FIG. 23(*m*) is an example of an image record error screen which is to be displayed when no image to be transmitted is stored in the electronic camera 1. This error screen is displayed in place of the menu screen which is displayed in the step S11 of FIG. 2.

Figure 24:
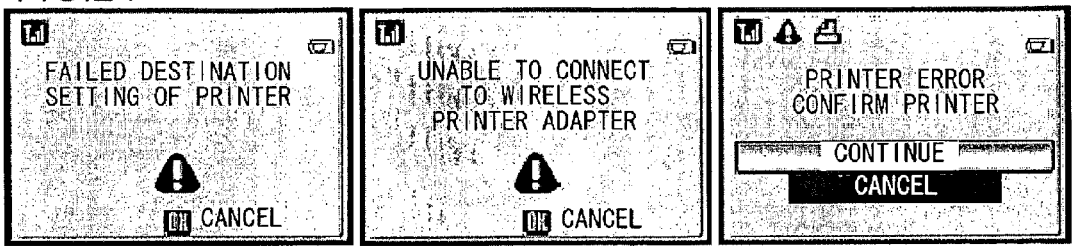
FIG. 24 is, as in FIG. 23, an illustration showing examples of an error screen displayed on the electronic camera.

Error screens shown in FIG. 24(*a*) to (*c*) are displayed at the time of connection to the printer. FIG. 24(*a*) is an example of a printer setting error screen which is to be displayed when the connection setting to the printer can not be successfully performed. FIG. 24(*b*) is an example of a printer connection error screen which is to be displayed when a wireless LAN channel is not established between the electronic camera 1 and a printer that is connected thereto via wireless LAN in ad hoc mode as the printer 42 connected to the dongle for printer 41. FIG. 24(*c*) is an example of a printer error screen which is to be displayed when the destination printer is not working properly.

The electronic camera 1 displays the variety of error screens as has been explained above on the liquid crystal display 21 in accordance with the situation at the time. This notifies the user of error occurrence and, as necessary, requests a reoperation.

10. Operation of Online Album Server

Figure 25:
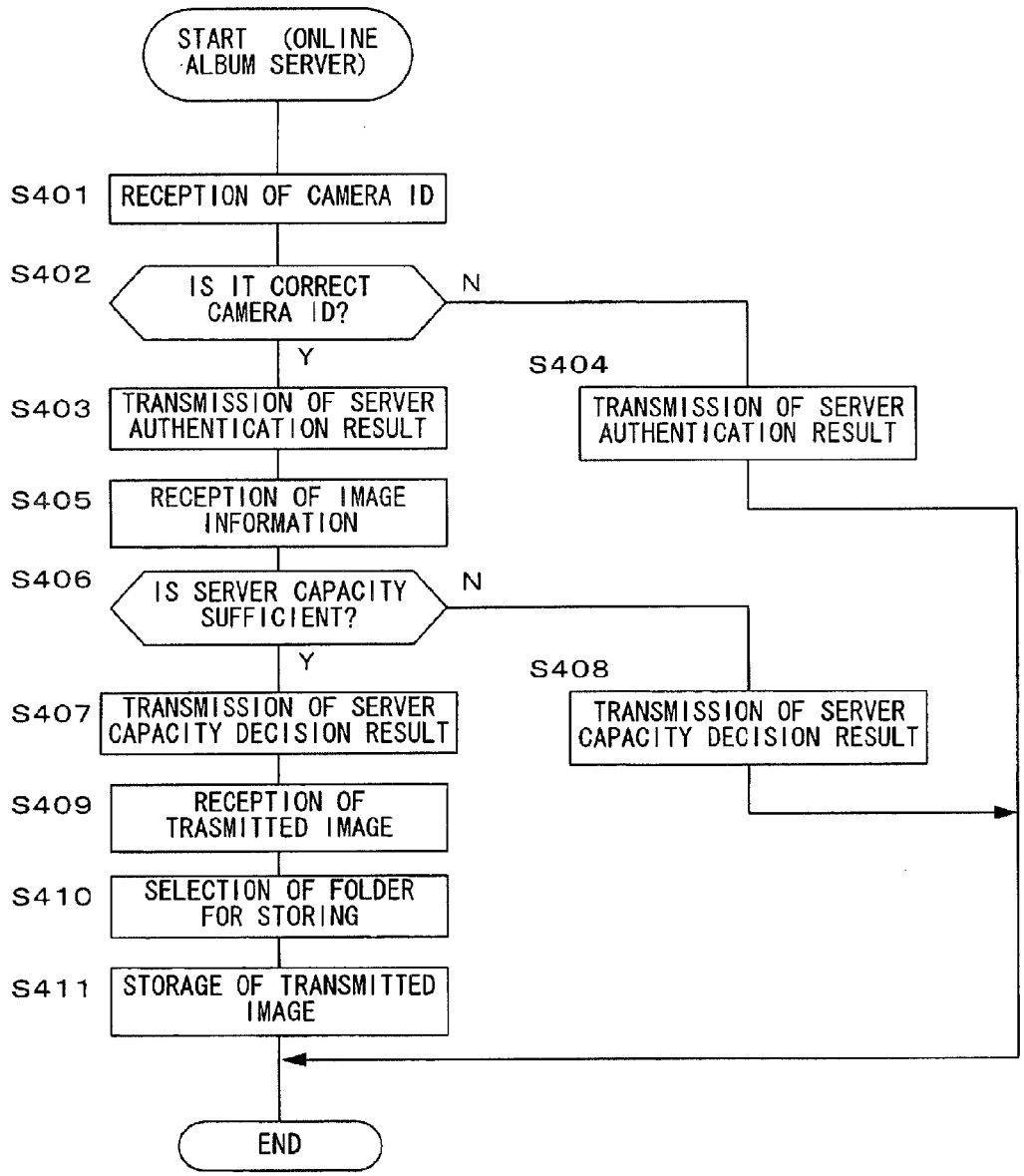
FIG. 25 is a flow chart of processing that is executed in the online album server when an image is transmitted from the electronic camera to the online album server.

Next, operation of the online album server 34 will be explained. FIG. 25 is the flow chart of processing executed by the online album server 34 when an image is transmitted from the electronic camera 1 to the online album server 34. In a step S401, the online album server 34 receives a camera ID from the electronic camera 1. This camera ID is transmitted from the electronic camera 1 in the step S129 of FIG. 4.

In a step S402, a decision is made as to whether or not the camera ID received in the step S401 is correct. If the camera ID is correct, the flow proceeds to a step S403. If the camera ID is not correct, the flow proceeds to a step S404. This decision is made by comparing the legitimate camera ID recorded in the online album server 34 and the camera ID transmitted from the electronic camera 1. This causes the server authentication to be performed based upon the camera ID, and causes the user of the electronic camera 1 to be identified. It should be noted that if the camera ID is determined for the electronic camera 1 by combining a fixed ID number and a variable ID number which is calculated in a predetermined algorithm as described above, it is necessary to calculate the legitimate camera ID in the similar manner also in the online album server 34.

In the step S403 or the step S404, the result of the decision in the step S402 is transmitted to the electronic camera 1 as the server authentication result. More specifically, in the case where the flow proceeds from the step S402 to the step S403, it is transmitted to the electronic camera 1 that the server authentication result was OK. In this case, after the transmission of the server authentication result, the flow proceeds to a next step S405. On the other hand, in the case where the flow proceeds from the step S402 to the step S404, it is transmitted to the electronic camera 1 that the server authentication result was not OK. In this case, after the transmission of the server authentication result, the flow chart of FIG. 25 terminates. Accordingly, image transmission from the electronic camera 1 to the online album server 34 is not performed.

In the step S405, the online album server 34 receives image information from the electronic camera 1. This image information is transmitted from the electronic camera 1 in the step S131 of FIG. 4, and represents the number of images to be transmitted, their transmission sizes, and the like. In a next step S406, based upon the image information received in the step S405, a decision is made as to whether or not the server capacity is sufficient. If a decision that the server capacity is sufficient is made, the flow proceeds to a step S407. If a decision that the server capacity is not sufficient is made, the flow proceeds to a step S408.

In the step S407 or the step S408, the result of the decision in the step S406 is transmitted to the electronic camera 1 as the server capacity decision result. More specifically, in the case where the flow proceeds from the step S406 to the step S407, it is transmitted to the electronic camera 1 that the server capacity is sufficient. In this case, after the transmission of the server capacity decision result, the flow proceeds to a next step S409. On the other hand, in the case where the flow proceeds from the step S406 to the step S408, it is transmitted to the electronic camera 1 that the server capacity is not sufficient. In this case, after the transmission of the server capacity decision result, the flow chart of FIG. 25 terminates. Accordingly, image transmission from the electronic camera 1 to the online album server 34 is not performed.

In the step S409, the online album server 34 receives a transmitted image from the electronic camera 1. This transmitted image is transmitted from the electronic camera 1 in the step S134 of FIG. 4. In a next step S410, a folder for storing therein the transmitted image received in the step S409 is selected. Here, a folder is selected for storing from among a plurality of folders which have been set in the online album registered in regard to the user of the electronic camera 1, which is a transmission source of the image. More specifically, if the user has specified any of the folders as a storage of images in advance, the folder is selected as the folder for storing. On the other hand, in the initial state where the user has not specified a storage of images, a folder that has been set as the initial folder is used as the folder for storing.

It should be noted that the initial folder described above is preferably not open to the public, i.e., the image stored in the folder is closed to anyone but the user. This can prevent the image from being published without the user's knowledge. On the other hand, in the case where the folder for storing has been specified by the user in advance, it is preferable that the user can also specify whether or not to publish the image in the folder. This allows a decision to be made as to whether or not the image is published in accordance with the desire of the user.

In a step S411, the transmitted image received in the step S409 is stored in the folder for storing selected in the step S410. This causes the transmitted image from the electronic camera 1 to be stored in one of the plurality of folders which have been set in the online album of the user. The transmitted image that is thus stored can be published on the Internet or processed in any manner by the user accessing the online album server 34 using a PC or the like. After executing the step S411, the flow chart of FIG. 25 terminates.

The processing explained above is executed by the online album server 34 so as to transmit the image captured by the electronic camera 1 to the online album server 34, and then the transmitted image is stored in the online album for each user.

11. Operation of the Mail Transmission Server

Figure 26:
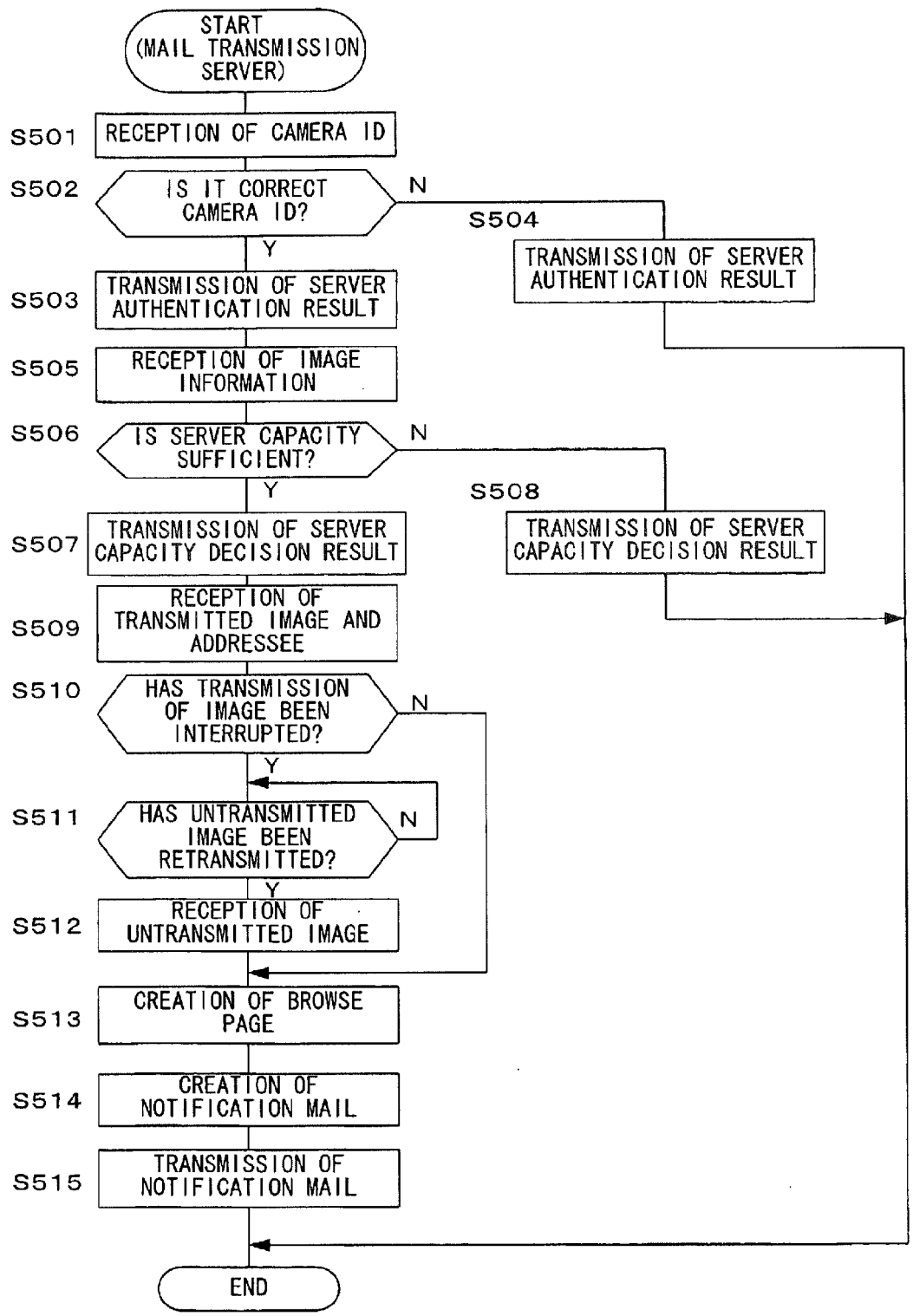
FIG. 26 is a flow chart of processing that is executed in the mail transmission server when an image is transmitted from the electronic camera to the mail transmission server.

Next, operation of the mail transmission server 35 will be explained. FIG. 26 is the flow chart of processing executed by the mail transmission server 35 when an image is transmitted from the electronic camera 1 to the mail transmission server 35. In steps S501 to S508 of this flow chart, the same processing as in the steps S401 to S408 of FIG. 25 is executed. Therefore, an explanation for the processing content will be omitted.

In a step S509, the mail transmission server 35 receives a transmitted image and an addressee from the electronic camera 1. Of these, the transmitted image is transmitted from the electronic camera 1 in the step S134 of FIG. 4 and the addressee is transmitted from the electronic camera 1 together with the transmitted image. In a next step S510, a decision is made as to whether or not the transmission of the image from the electronic camera 1 has been interrupted. If the transmission of the image has been interrupted, the flow proceeds to a step S511. On the other hand, if all the images that are objects of transmission have been transmitted without interruption, the flow proceeds to a step S513. In this manner, it is detected in the step S510 that the image transmission from the electronic camera 1 has been interrupted.

In the step S511, a decision is made as to whether or not the image transmission has been resumed in the electronic camera 1 and whether or not the untransmitted image at the time of the transmission interruption has been retransmitted from the electronic camera 1. Until the untransmitted image is retransmitted, the flow remains in the step S511. When the untransmitted image is retransmitted, the flow proceeds to a next step S512. In this manner, in the case where the interruption of the image transmission is detected in the step S510, a step S514 described below is not executed until the untransmitted image is retransmitted, so as to suspend creation of a notification mail. And then, when the untransmitted image is retransmitted, the suspension of the creation of the notification mail is released. In the step S512, the mail transmission server 35 receives the untransmitted image that is retransmitted from the electronic camera 1.

In the step S513, based upon the transmitted image received in the step S509, creation of a browse page is performed for browsing the image transmitted from the electronic camera 1. At this time, if an untransmitted image was received in the step S512, the browse page is created including the untransmitted image. On this browse page, thumbnail images, each of which is the shrunk image of that transmitted from the electronic camera 1, are placed and displayed side-by-side. The viewer can enlarge or download the image by clicking on the thumbnail image of the image he desires. It should be noted that the browse page created herein is, as described above, erased after a predetermined period of time.

In the step S514, a notification mail is created in order to introduce the browse page created in the step S513 to those people other than the user of the electronic camera 1. This notification mail includes link information for connecting to the browse page. Moreover, the notification mail has attached thereto a thumbnail image that is the shrunk image of that transmitted from the electronic camera 1. It should be noted that if there are more than a predetermined number of images transmitted from the electronic camera 1, some of the transmitted images are selected from among them and whose thumbnail images are attached to the notification mail. For instance, if it is configured that up to three thumbnail images are attached to the notification mail, when more than three images are transmitted from the electronic camera 1, three of them are selected and attached to the notification mail. At this time, in accordance with the order in which each of the transmitted images was captured with the electronic camera 1 or the like, the transmitted image whose thumbnail is attached to the notification mail can be selected. For instance, three images are selected in the order of capture from the earliest, and their thumbnail images are attached to the notification mail.

In a step S515, the notification mail created in the step S514 is transmitted to the mail address specified in the addressee received from the electronic camera 1 in the step S509. This causes the notification mail to be transmitted to the addressee that the user of the electronic camera 1 selected in the above described manner. After executing the step S515, the flow chart of FIG. 26 terminates.

The processing explained above is executed by the mail transmission server 35 so as to transmit the image captured by the electronic camera 1 to the mail transmission server 35, and a browse page is created for browsing the transmitted image. And then, a notification mail for introducing the transmitted image is transmitted to a specified mail address.

It should be noted that the browse page created in the step S513 includes the mail address of the user of the electronic camera 1 who transmitted the image. By publishing the mail address of the user in this manner, abuse of the mail transmission service can be prevented. The abuse of the mail transmission service referred herein includes, for instance, making an image which is offensive to public order and morals browsable, making an image which annoys others browsable, or the like. It should be noted that as described above the mail address of the user has been registered in advance in the electronic camera 1, and is transmitted when the image is transmitted from the electronic camera 1.

According to the embodiment described above, the following operations and advantageous effects can be achieved.

(1) An image transmission system includes the electronic camera 1, the online album server 34, and the mail transmission server 35. In the image transmission system, it is configured that the electronic camera 1 selects either the online album server 34 or the mail transmission server 35 as a destination of an image (steps S100 and S200) and transmits the image to the selected destination server (steps S112 and S219). Due to this, the most appropriate destination can be selected from among a plurality of destinations, and the image by the electronic camera can be transmitted to the destination. It should be noted that although, in the above described embodiment, the explanation is made in terms of an example in which one of the two servers, i.e., the online album server 34 and the mail transmission server 35, is selected as a destination of the image, also in the case where there are three or more servers, the destination of the image may be selected from among those servers in the same manner.

(2) The online album server 34 provides the online album service in which the image transmitted from the electronic camera 1 is stored in an online album that has been registered in advance. And, the mail transmission server 35 provides the mail transmission service in which a notification mail for introducing the image transmitted from the electronic camera 1 to those people other than the user of the electronic camera 1 is created, and in which the created notification mail is transmitted to a specified mail address. By doing this, a variety of services that are useful for the user can be provided using the image transmitted from the electronic camera.

(3) In the steps S100 and S200, the user is required to select which one to use from the online album service provided by the online album server 34 and the mail transmission service provided by the mail transmission server 35, and the destination server can be selected in accordance with the selection result. This allows the destination server to be selected in accordance with the service that the user desires to use.

(4) Or, in the steps S100 and S200, the destination server can be selected depending upon the shipment destination of the electronic camera 1 which has been set in advance. This allows the most appropriate destination server to the shipment destination to be selected even if the specifications of the electronic camera vary from one shipment destination to another.

(5) The transmission size selection screen is displayed on the liquid crystal display 21 (steps S108 and S209). On the transmission size selection screen, a decision is made as to the transmission size selected by operation of the user (steps S109 and S210). It is arranged to convert the image size in accordance with the transmission size when the image is transmitted to the destination server in the step S112 or S219. By doing this, the size of the image can be converted into that appropriate to transmission of the image to the destination server.

(6) When the image size is converted in the above described manner, if "Print Size", "PC Size", or "TV Size" is selected by the user on the transmission size selection screen, it is arranged to convert the original image size into an image size smaller than that. This can prevent the server capacity from being wasted.

(7) And, in the case where the original image size is specified by the user by selecting "Original" on the transmission size selection screen, it is arranged not to convert the image size. This allows the user to transmit a captured image without degrading if necessary.

(8) For at least one of the online album server 34 or the mail transmission server 35, the user may not be allowed to specify the original image size when transmitting an image to the server. This prevents a large-sized image from being transmitted from the electronic camera with the original image size remaining the same, thereby preventing the server capacity from being wasted. It should be noted that also in the case where there are three or more servers, for at least one of those servers, the user may not be allowed to specify the original image size in the same manner when transmitting an image to the server.

(9) The mail transmission server 35 receives the image transmitted thereto from the electronic camera 1 via wireless LAN (step S509), and creates a browse page for browsing the transmitted image (step S513). And then, it is arranged to create a notification mail in order to introduce the created browse page to those people other than the user of the electronic camera 1 (step S514), and to transmit the notification mail to the specified mail address (step S515). By doing this, a useful service can be provided using the image transmitted from the electronic camera to the server device.

(10) In the step S514 it is arranged to create a notification mail that contains link information for connecting to the browse page. This allows the person who receives the notification mail to easily access the browse page published on the Internet.

(11) In the step S514 it is arranged to create a notification mail having attached thereto a thumbnail image that is the shrunk image of that transmitted from the electronic camera 1. This allows the person who receives the notification mail to know what image to be placed on the browse page before accessing the browse page.

(12) As described above, when creating a notification mail having a thumbnail image attached thereto in the step S514, if there are more than a predetermined number of images transmitted from the electronic camera 1, it is arranged to select some of the transmitted images and to create the notification mail having attached thereto the thumbnail images of the selected transmitted images. This prevents a multitude of thumbnail images from being attached to the notification mail, thereby limiting the amount of data of the notification mail.

(13) When some of the images transmitted from the electronic camera 1 are selected in the above described manner, a decision can be made as to which transmitted image to select based upon the order in which each of the transmitted images was captured by the electronic camera 1. By doing this, the image whose thumbnail is appropriate to be attached to the notification mail is selected easily and properly from among all the captured images.

(14) Since it is arranged to erase the browse page created in the step S513 after a predetermined period of time, the storage capacity of the server can be ensured even in the case of long term operation.

(15) It is arranged to detect interruption of an image transmission from the electronic camera 1 (step S510), and to ignore the step S514 so as to suspend creation of a notification mail if the interruption of the image transmission is detected. In this manner, since it is arranged not to create a notification mail as long as there is an untransmitted image from the electronic camera, a notification mail can be prevented from being accidentally transmitted before transmission of image is not completed.

(16) As described above, in the case where interruption of an image transmission is detected in the step S510, retransmission of an untransmitted image from the electronic camera 1 is detected (step S511). And, when an untransmitted image is retransmitted from the electronic camera 1, it is arranged to create a notification mail in the step S514 and to release the suspension of creation of the notification mail. Due to this, when the interrupted image transmission is completed, the notification mail can be immediately created and transmitted.

(17) It is arranged to create a browse page that includes the mail address of the user of the electronic camera 1 in the step S513. This can prevent the mail transmission service from being abused.

(18) The mail address of the user included in the above described browse page has been registered in advance in the electronic camera 1, and it is arranged to be transmitted to the mail transmission server 35 when the image is transmitted from the electronic camera 1. This allows the mail address of the user to be securely obtained when the browse page is created.

(19) In the online album server 34, an online album is registered for each user of the electronic camera 1, and a plurality of folders are set in each of the registered online albums. And, it is arranged to receive the image transmitted from the electronic camera 1 via wireless LAN (step S409), and to store the transmitted image in one of the plurality of folders set in the online album of the user (step S411). By doing this, a useful service can be provided using the image transmitted from the electronic camera to the server device.

(20) In the step S411 it is arranged to store the transmitted image from the electronic camera 1 in the initial folder that has been set in advance from among the plurality of folders. This allows the transmitted image to be stored in an appropriate folder even in the case where the user has not specified the folder in which the image is stored.

(21) In the case where the transmitted image is stored in the initial folder as described above, it is preferable that the image stored in the initial folder is not published to anyone but the user. This can prevent the image from being published without the user's knowledge.

(22) In the electronic camera 1, the operation mode is switched among a variety of operation modes in response to operation input of the user on the mode dial included in the operation unit 16. And, when the operation mode is switched to the wireless LAN mode, it is arranged to search for an access point that can communicate wirelessly with the wireless LAN module unit 24 (step S6). Due to this, the electronic camera can be provided, which is suitable for transmitting an image to one of a server, a personal computer, and a printer, selectively.

(23) The destination selection screen is displayed with a list displayed thereon of the SSIDs of the access points found in the step S6 (step S8) and it is detected that one of the SSIDs was selected by operation input of the user (step S9), so as to select one of the access points in response to operation input of the user. And, in accordance with the selection result of the access point, a menu screen on which a list of a variety of menu items is displayed is displayed on the liquid crystal display 21 (step S11). At this time, in accordance with the network connection configuration of the selected access point, it is arranged to vary the display configuration of the menu screen. This allows a menu screen with an appropriate content to be displayed even in the case where the network connection configuration varies depending upon the selected access point.

(24) In the step S11, menu items displayed in a list on the menu screen vary depending on whether or not the access point selected in the above described manner is connected to the server. Due to this, it is arranged to vary the display configuration of the menu screen. This allows only the menu items necessary in each case to be displayed in a list on the menu screen. As a result, on the menu screen, the user can easily select the menu items that he desires to execute.

(25) And, in the step S11, menu items displayed in a list on the menu screen vary depending on whether or not the selected access point is connected to the personal computer. Due to this, it is arranged to vary the display configuration of the menu screen. Similarly to the above, this allows only the menu items necessary in each case to be displayed in a list on the menu screen. As a result, on the menu screen, the user can easily select the menu items that he desires to execute.

(26) Furthermore, in the step S11, menu items displayed in a list on the menu screen vary depending on whether or not the selected access point is connected to the printer. Due to this, it is arranged to vary the display configuration of the menu screen. Similarly to the above two, this allows only the menu items necessary in each case to be displayed in a list on the menu screen. As a result, on the menu screen, the user can easily select the menu items that he desires to execute.

(27) For the access point selected in response to the operation input of the user on the destination selection screen, a decision is made as to whether or not the access point is connected only to either the server or the printer (the step S10). And, if the selected access point is connected only to either the server or the printer, the flow is arranged to ignore the step S11 and to proceed to the step S13 so as not to display the menu screen. This allows the display of the menu screen to be omitted in the case where the display of the menu screen is unnecessary because there is only one menu item to be displayed on the menu screen.

(28) When a decision is made in the step S10 as to whether or not the selected access point is connected only to either the server or the printer, or when the display configuration of the menu screen is varied in the step S11 in accordance with the network connection configuration of the selected access point, based upon the profile information of each of the devices that has been registered in advance, it is arranged to make a decision as to the network connection configuration of the selected access point. This can ensure a decision as to the network connection configuration of the selected access point.

(29) In the electronic camera 1, by displaying the image selection screen on the liquid crystal display 21 (steps S106 and S207) and by making a decision that any image was selected by operation of the user on the image selection screen (steps S107 and S208), the image to be transmitted to the online album server 34 or the mail transmission server 35 is selected according to operation of the user. After the image is selected in this manner, it is arranged to execute image transmission processing (steps S112 and S219) and it is arranged that the wireless LAN module unit 24 starts wireless communication with the access point in the image transmission processing (step S121). And, also at the time of transmitting an image to the personal computer or the printer, it is similarly arranged to start wireless communication with the access point after the image is selected according to operation of the user. Due to this, the electronic camera can be provided, which is suitable for transmitting an image to one of the server, the personal computer, and the printer, selectively.

(30) After the image selected in the above described manner is transmitted, it is arranged to perform disconnection of the network (step S136) and to terminate the wireless communication with the access point by the wireless LAN module unit 24. This can prevent the battery from being wasted.

(31) It is arranged to stop the power supply to the wireless LAN module unit 24 (step S137) after disconnection of the network is performed in the step S136 and the wireless communication with the access point is terminated by the wireless LAN module unit 24. This can further prevent the battery from being wasted.

(32) In the electronic camera 1, transmitting person information entered by the user is registered. And, at the time of performing image transmission to the mail transmission server 35, it is arranged to make a decision as to whether or not this transmitting person information has been registered (step S201), and if the transmitting person information has not been registered, it is arranged not to perform the subsequent processing so as to inhibit the image transmission to the mail transmission server 35. Since this is done, at the time of image transmission it is possible to securely transmit the transmitting person information, which is necessary for creating a browse page in the mail transmission server 35, from the electronic camera 1 to the mail transmission server 35. As a result, the electronic camera can be provided, which is suitable for transmitting an image to a server that uses a transmitted image so as to provide a variety of services.

(33) It is arranged that the above described transmitting person information is the nickname and the mail address of the user, therefore, based upon this transmitting person information, a browse page that includes the mail address of the user can be created in the server.

(34) At the time of performing image transmission to the mail transmission server 35 in the step S219, it is arranged to transmit the transmitting person information registered in the electronic camera 1 to the mail transmission server 35. This allows the transmitting person information to be securely transmitted in accordance with the transmission from the electronic camera to the server at the time thereof.

(35) In the case where the user instructs image transmission to the mail transmission server 35 in a state in which transmitting person information has not been registered, it is arranged to request the user to register the transmitting person information (step S202). This allows the transmitting person information to be securely registered and to be transmitted to the server in the case where the user instructs transmission of image.

(36) In the electronic camera 1, prior to transmission of the image to the online album server 34 or the mail transmission server 35, it is arranged to transmit the camera ID for user authentication which is unique to each electronic camera 1 to the online album server 34 or the mail transmission server 35 (step S129). This allows the user authentication to be performed in the destination server so as to specify the user. As a result, the electronic camera can be provided, which is suitable for transmitting an image to a server that uses a transmitted image so as to provide a variety of services.

(37) The above described camera ID can be determined based upon a fixed ID number stored in encrypted form in advance in each electronic camera 1. This prevents the user from abusing the camera ID of other person or from tampering the camera ID.

(38) Moreover, a camera ID can be determined based upon the above described fixed ID number and another ID number, which is calculated according to a predetermined algorithm and whose content is changed at a predetermined timing. This can further prevent the camera ID from being abused or being tampered.

The above described embodiments and various modifications are examples, and the present invention is not limited to the above described embodiments and modifications without departing from the scope of the invention.

The disclosures of the following priority applications are herein incorporated by reference:
Japanese Patent Application No. 2006-227088 (filed on Aug. 23, 2006);
Japanese Patent Application No. 2006-227089 (filed on Aug. 23, 2006);
Japanese Patent Application No. 2006-227190 (filed on Aug. 23, 2006); and
Japanese Patent Application No. 2006-227191 (filed on Aug. 23, 2006).

The invention claimed is:
1. A server device comprising:
 a receiving unit that receives an image transmitted from an electronic camera via a wireless network;
 a browse page creation unit that creates a browse page for browsing the transmitted image from the electronic camera, the image having been received by the receiving unit;
 a mail creation unit that creates a notification mail for introducing the browse page that has been created by the browse page creation unit to a person other than a user of the electronic camera; and
 a mail transmission unit that transmits the notification mail that has been created by the mail creation unit to a specified mail address, wherein:

the mail creation unit creates a notification mail that has a thumbnail image attached, the thumbnail image being a smaller image of the transmitted image from the electronic camera, and if there are more than a predetermined number of images transmitted from the electronic camera, the mail creation unit selects some of the transmitted images and creates a notification mail that has thumbnail images of selected transmitted images attached.

2. The server device according to claim 1, wherein the notification mail includes link information for connecting to the browse page.

3. The server device according to claim 1, wherein the mail creation unit makes a decision as to which transmitted image to select based upon an order in which each of images transmitted from the electronic camera was captured.

4. The server device according to claim 1, wherein the browse page created by the browse page creation unit is erased after a predetermined period of time.

5. The server device according to claim 1, further comprising an interruption detection unit that detects interruption of image transmission from the electronic camera, wherein if interruption of image transmission is detected by the interruption detection unit, the mail creation unit suspends creation of the notification mail.

6. The server device according to claim 5, wherein if interruption of image transmission is detected by the interruption detection unit, the mail creation unit releases suspension of creation of the notification mail when an untransmitted image is retransmitted from the electronic camera.

7. A server device comprising:

a receiving unit that receives an image transmitted from an electronic camera via a wireless network;

a browse page creation unit that creates a browse page for browsing the transmitted image from the electronic camera;

a mail creation unit that creates a notification mail for introducing the browse page that has been created by the browse page creation unit to a person other than a user of the electronic camera; and a mail transmission unit that transmits the notification mail that has been created by the mail creation unit to a specified mail address, wherein the browse page creation unit creates a browse page that includes a mail address of a user of the electronic camera, and the mail address of the user has been registered in advance in the electronic camera, and is transmitted when an image is transmitted from the electronic camera.

* * * * *